(12) United States Patent
Vasic et al.

(10) Patent No.: US 12,066,349 B2
(45) Date of Patent: *Aug. 20, 2024

(54) SHAPED ARTICLE AND METHOD FOR PRODUCING A SHAPED ARTICLE

(71) Applicant: Exentis Knowledge GmbH, Stetten Ag (CH)

(72) Inventors: Srdan Vasic, Stetten Ag (CH); Rafael Schmitt, Stetten (CH)

(73) Assignee: Exentis Knowledge GmbH, Stetten Ag (CH)

( * ) Notice: Subject to any disclaimer, the term of this patent is extended or adjusted under 35 U.S.C. 154(b) by 475 days.

This patent is subject to a terminal disclaimer.

(21) Appl. No.: 17/416,393

(22) PCT Filed: Dec. 17, 2019

(86) PCT No.: PCT/EP2019/085801
§ 371 (c)(1),
(2) Date: Jun. 18, 2021

(87) PCT Pub. No.: WO2020/127387
PCT Pub. Date: Jun. 25, 2020

(65) Prior Publication Data
US 2021/0389198 A1 Dec. 16, 2021

(30) Foreign Application Priority Data

Dec. 21, 2018 (EP) .................... 18215759

(51) Int. Cl.
*G01L 9/00* (2006.01)
*B33Y 10/00* (2015.01)
*B33Y 80/00* (2015.01)

(52) U.S. Cl.
CPC .......... *G01L 9/0044* (2013.01); *G01L 9/0075* (2013.01); *B33Y 10/00* (2014.12); *B33Y 80/00* (2014.12)

(58) Field of Classification Search
CPC ..... G01L 9/0044; G01L 9/0075; B33Y 10/00; B33Y 80/00
See application file for complete search history.

(56) References Cited

U.S. PATENT DOCUMENTS

| 4,984,468 A | 1/1991 | Hafner |
| 5,199,303 A | 4/1993 | Benedikt et al. |

(Continued)

FOREIGN PATENT DOCUMENTS

| CN | 102460101 A | 5/2012 |
| CN | 103229033 | 7/2013 |

(Continued)

OTHER PUBLICATIONS

L-M Faller et al, "Rapid prototyping of force/pressure sensors using 3D- and inkjet-printing", Journal of Micromechanics & Microengineering, Institute of Physics Publishing, Bristol, GB, vol. 28, No. 10, p. 104002, Jul. 3, 2018.

(Continued)

*Primary Examiner* — Freddie Kirkland, III
(74) *Attorney, Agent, or Firm* — MARSHALL, GERSTEIN & BORUN LLP

(57) ABSTRACT

Shaped body, in particular for a pressure sensor, having a membrane and having a supporting section supporting the membrane, the membrane being produced at least in sections from a ceramic material by means of additive manufacturing, in particular 3D screen printing, and the greatest possible distance between two points lying on the outer circumference of the membrane (12) is less than 20 mm.

15 Claims, 34 Drawing Sheets

(56) References Cited

U.S. PATENT DOCUMENTS

| | | | |
|---|---|---|---|
| 5,614,678 A | | 3/1997 | Kurtz et al. |
| 5,714,103 A | | 2/1998 | Bauer et al. |
| 5,997,671 A | * | 12/1999 | Takeuchi ............... C04B 35/486 |
| | | | 156/89.12 |
| 8,815,625 B2 | | 8/2014 | Monichino |
| 8,878,313 B2 | | 11/2014 | Salmaso |
| 9,835,510 B2 | | 12/2017 | Tham |
| 10,697,844 B2 | * | 6/2020 | Hess ..................... G01L 19/148 |
| 10,883,892 B2 | | 1/2021 | Rossberg et al. |
| 11,137,320 B2 | * | 10/2021 | Staiger .................. G01L 9/0044 |
| 11,247,437 B2 | | 2/2022 | Partsch et al. |
| 11,260,556 B2 | * | 3/2022 | Abbott, Jr. ............. B33Y 10/00 |
| 2006/0130956 A1 | | 6/2006 | White et al. |
| 2014/0251030 A1 | * | 9/2014 | Hopman ............... G01L 9/0044 |
| | | | 73/862.636 |
| 2015/0360463 A1 | | 12/2015 | Sadwick et al. |
| 2016/0056363 A1 | | 2/2016 | Haque et al. |
| 2016/0103031 A1 | | 4/2016 | Tham |
| 2017/0158488 A1 | | 6/2017 | Brown |
| 2018/0306663 A1 | * | 10/2018 | Hess ..................... G01L 9/0055 |
| 2019/0134955 A1 | | 5/2019 | Partsch et al. |
| 2019/0360894 A1 | | 11/2019 | Staiger et al. |
| 2021/0389198 A1 | | 12/2021 | Vasic et al. |
| 2021/0389199 A1 | * | 12/2021 | Vasic ..................... G01L 9/0075 |
| 2022/0082463 A1 | * | 3/2022 | Vasic ...................... B28B 1/001 |
| 2022/0085463 A1 | | 3/2022 | Suzuki et al. |
| 2022/0155165 A1 | * | 5/2022 | Vasic ..................... G01L 9/0075 |

FOREIGN PATENT DOCUMENTS

| | | |
|---|---|---|
| CN | 104034475 A | 9/2014 |
| CN | 105509935 A | 4/2016 |
| CN | 108136742 A | 6/2018 |
| CN | 108369148 A | 8/2018 |
| DE | 29619276 U1 | 1/1997 |
| DE | 19645613 A1 | 9/1997 |
| EP | 2781902 A1 | 9/2014 |
| EP | 3176557 A1 | 6/2017 |
| GB | 1369627 A | 10/1974 |
| JP | 2005047723 A | 2/2005 |
| WO | WO-2016/026541 A1 | 2/2016 |
| WO | WO-2017/021291 A1 | 2/2017 |

OTHER PUBLICATIONS

International Search Report and Written Opinion, corresponding International Application No. PCT/EP2019/085795, mailing date Feb. 12, 2020.
International Search Report and Written Opinion, corresponding International Application No. PCT/EP2019/085798, mailing date Apr. 17, 2020.
International Search Report and Written Opinion, corresponding International Application No. PCT/EP2019/085801, mailing date Apr. 8, 2020.
International Search Report and Written Opinion, corresponding International Application No. PCT/EP2019/085802, mailing date Apr. 15, 2020.
Chinese First Office Action for Corresponding Chinese Application No. 201980085336.3, issued Oct. 27, 2022.
Chinese First Office Action for Corresponding Chinese Application No. 201980085337.8, issued Apr. 19, 2022.
Chinese First Office Action for Corresponding Chinese Application No. 201980085339.7, issued Apr. 18, 2022.
Chinese First Office Action for Corresponding Chinese Application No. 201980085254.9, issued Apr. 18, 2022.
Australian First Office Action for Corresponding Australia Application No. 2019406460, dated May 2, 2022.
Australian First Office Action for Corresponding Australia Application No. 2019406536, dated May 9, 2022.
Australian First Office Action for Corresponding Australia Application No. 2019406537, dated May 11, 2022.
Australian First Office Action for Corresponding Australia Application No. 2019409813, dated May 11, 2022.

* cited by examiner

SHAPED ARTICLE AND METHOD FOR PRODUCING A SHAPED ARTICLE

CROSS-REFERENCED TO RELATED APPLICATIONS

This application is a U.S. National stage of International Patent Application No. PCT/EP2019/085801 filed Dec. 17, 2019, which claims the benefit of European Patent Application No. 18215759.4 filed Dec. 21, 2018, the respective disclosures of which are each incorporated herein by reference in their entireties.

FIELD OF THE DISCLOSURE

The present invention relates to a shaped body, in particular for a pressure sensor, a pressure sensor having such a shaped body, and a method for producing a shaped body.

BRIEF DESCRIPTION OF THE RELATED TECHNOLOGY

So-called ceramic or metallic pressure sensors can be used for measuring the pressure of gaseous or liquid media. Ceramic pressure sensors with a ceramic sensor body containing a membrane are particularly suitable for measuring the pressure of aggressive media.

However, the manufacturing of ceramic pressure sensors is associated with a relatively high level of effort. For example, ceramic sensor bodies produced by means of pressing regularly require complex post-processing steps. This is because the press processes used can only produce relatively thick and uneven layers. The respective membrane of the sensor body must therefore be mechanically reworked after pressing, for example by means of grinding or lapping, in order to produce a sufficiently thin membrane thickness on the one hand and to ensure the required accuracy of the membrane on the other hand. Finally, production by a pressing process results in restrictions with regard to the geometric shapes and dimensions of ceramic pressure sensors.

SUMMARY

Against the background set out above, the object of the present invention was to specify a shaped body, in particular for a pressure sensor, which can be produced with reduced effort, and increased flexibility, respectively. Likewise, the object was to disclose a method for producing a shaped body.

With respect to the shaped body, this object has been solved according to the invention by the subject matter of claim 1. A method for producing a shaped body is subject of claim 15. Advantageous embodiments are the subject of the dependent claims and discussed in detail below.

A shaped body according to the invention is particularly suitable for a pressure sensor. Such a pressure sensor with a shaped body according to the invention can be used in particular for measuring the pressure of fluids. A shaped body according to the invention can consequently be a sensor body, in particular a sensor body for a pressure sensor.

A shaped body according to the invention has a membrane and a supporting section supporting the membrane, the membrane being produced at least in sections from a ceramic material by additive manufacturing, in particular 3D screen printing. In accordance with the invention, the greatest possible distance between two points lying on the outer circumference of the membrane is less than 20 mm.

With such a small-sized membrane, it is possible to realize small overall designs and improve the possible applications for such a shaped body. In particular, such a shaped body can be used in pressure sensors with a particularly small design. The use of additive manufacturing, in particular 3D screen printing, in addition makes it possible to produce the membrane with the desired outer dimensions, in particular with outer dimensions according to which the greatest possible distance between two points lying on the outer circumference of the membrane is less than 20 mm, in a particularly advantageous manner with only minimal effort. The overall manufacturing effort can thus be reduced. At the same time, losses in component quality or manufacturing accuracy can be avoided or kept to a negligible level by using additive manufacturing, in particular 3D screen printing.

In the present context, a membrane can be understood as a section of material that comprises resilience in operation, in particular in measurement operation, and in particular ensures a flexibility that can be measured in operation. What is important here is the deformation behavior of the membrane as a whole. In this context, it is possible that individual sections of the membrane itself have a lower deformability than other sections. Likewise, it is possible that individual sections of the membrane are completely stiffened. For the purposes of the present invention, a membrane may be limited outwardly by dimensionally rigid structures or sections of material, in particular by the supporting section supporting the membrane. Accordingly, the outward boundary of a membrane may be defined by structures or material sections that do not exhibit sufficient or suitably measurable resilience behavior during operation, particularly during measurement operation. The supporting section supporting the membrane can therefore be sufficiently rigid.

According to a preferred embodiment of the present invention, the membrane has, at least in sections, a thickness of less than 0.5 mm, preferably less than 0.4 mm, preferably less than 0.35 mm, preferably less than 0.3 mm, more preferably less than 0.25 mm, still more preferably less than 0.225 mm, in particular less than 0.2 mm. By dimensioning the membrane thickness in this way, a particularly high measurement accuracy or measurement sensitivity can be achieved in the use of a respective pressure sensor.

In a further advantageous manner, the membrane can, at least in sections, have a thickness of more than 0.1 mm, preferably more than 0.15 mm, more preferably more than 0.175 mm or more than 0.2 mm. Such a minimum thickness can ensure sufficient stability and/or gas tightness of the membrane and thus guarantee a relatively high degree of operational reliability.

The use of additive manufacturing, in particular 3D screen printing, makes it possible to produce the membrane with the desired dimensions, in particular with the desired thicknesses, in a particularly advantageous manner with only minimal effort. Any post-processing steps required to achieve the desired membrane thickness or the uniformity and/or accuracy of the membrane thickness can be reduced to a minimum or avoided completely.

In addition to the membrane, the supporting section supporting the membrane can also preferably consist at least in part of a ceramic material. In particular, the supporting section supporting the membrane can also be produced by means of additive manufacturing, preferably by means of 3D screen printing. In this way, the manufacturing effort can be further reduced and the media resistance of the shaped body produced in this way can be improved.

In a further preferred manner, the membrane and/or the supporting section can each be made entirely of a ceramic material. This can further improve the media resistance.

The membrane and/or the supporting section supporting the membrane can advantageously be made of aluminum oxide or contain aluminum oxide. The membrane and/or the supporting section can be made at least in sections from aluminum oxide or a material composition containing aluminum oxide. Likewise, the membrane and/or the supporting section can be made entirely of aluminum oxide or a material composition containing aluminum oxide. Aluminum oxide is particularly suitable for use in aggressive media and thus ensures a particularly high degree of resistance in operation.

As mentioned above, the ceramic material for the membrane and/or the supporting section can be aluminum oxide or a material composition containing aluminum oxide. However, other ceramic materials can also be used for the manufacture of the membrane and/or the supporting section.

According to an advantageous embodiment, the membrane and the supporting section can be made of an identical material or materials with an identical composition, which enables particularly efficient production.

It is also possible that the materials and/or material compositions of the membrane and the supporting section differ from each other, at least in sections. In a preferred manner, it is possible that the materials of the membrane and the supporting section have an identical basic material and/or different auxiliary materials. The respective desired operating properties of the membrane and the supporting section can thus be influenced in an advantageous manner.

It is also possible for the membrane to be made entirely of a single material or a single material composition and for the supporting section to be produced from a plurality of different materials or material compositions. In particular, the supporting section, in a region adjacent to the membrane in the circumferential direction, can be produced from a material that is identical to the material of the membrane. The other layers of the supporting section, which are applied to the region surrounding the membrane in the circumferential direction, can be made of a different material or a material composition. In this way, manufacturing flexibility can be further improved and the operating properties of the shaped body can be matched particularly flexibly to the respective application.

In a further preferred manner, the membrane and the supporting section can be produced in one piece and/or form a monolithic body. In this way, a subsequent connection of the membrane to the supporting section can be avoided. Any transition between the membrane and the supporting section can thus be insusceptible to damage.

It can also be advantageous if the membrane and/or the supporting section are produced entirely by means of 3D screen printing. In particular, 3D screen printing can be used to produce the membrane and, in the same process, the support section, thus enabling overall efficient production. It is also possible that only part of the membrane and/or the supporting section is generated by 3D screen printing. Material sections can therefore first be produced by other processes and then supplemented with further material layers by means of the 3D screen printing process in order to obtain the respective desired final shape of the membrane or the supporting section. The manufacturing flexibility can be further improved in this way.

According to a further embodiment of the present invention, the membrane may be produced free of mechanical post-processing, in particular free of machining post-processing. It should here be understood as mechanical post-processing that already existing contours or surfaces are subjected to a mechanical machining process to change the geometry or surface accuracy. The drying and sintering processes typically used for 3D screen printing technology are not understood here as mechanical post-processing.

By avoiding mechanical post-processing, the manufacturing effort can be reduced in a particularly advantageous manner. It is also possible to carry out mechanical post-processing before any sintering process, in particular after a drying process. In other words, the green body that has not yet been sintered is subjected to mechanical post-processing, which can be accomplished with relatively little effort.

Advantageously, the membrane can be produced exclusively by means of 3D screen printing. Thus, a membrane could be generated by 3D screen printing, in particular by generating several layers in the 3D screen printing process, and the final membrane could already be obtained after completion of the 3D screen printing steps. In this case, the generation by means of 3D screen printing can advantageously be carried out in such a way that mechanical post-processing, in particular machining post-processing, can be avoided. Likewise, the supporting section can also be produced exclusively by means of 3D screen printing.

Advantageously, the membrane can be produced from a plurality of layers. In a particularly preferred manner, the membrane is generated from a number of at least three layers and/or fifteen layers at the most. Likewise, the membrane may be generated from a number more than four and less than twelve layers. In particular, the membrane may be generated from a number of five to fifteen layers or ten to fifteen or three to twelve, three to ten or five to ten or six to eight layers.

According to a further advantageous embodiment of the shaped body according to the invention, the supporting section can be produced from a plurality of printed layers. In particular, both the membrane and the supporting section can each be generated from a plurality of printed layers. In this case, at least one printed layer of the membrane may have a smaller thickness than a printed layer of the supporting section.

By creating the membrane from a plurality of layers of relatively small thickness, a total membrane thickness with relatively high accuracy can be achieved. In contrast, rapid production can be achieved by creating the supporting section from a plurality of layers of relatively large thickness. By using relatively thick layers, the desired overall height of the supporting section can be achieved in just a few process steps. Production efficiency can be improved in this way.

It can be further advantageous if the supporting section in an area adjacent to the membrane in the circumferential direction has layer thicknesses that correspond to the layer thicknesses of the membrane. Likewise, the supporting section in an area adjacent to the membrane in the circumferential direction can be produced from layers that merge into layers of the membrane without interruption. It is therefore possible for the membrane and the areas of the supporting section adjacent to the membrane in the circumferential direction to be each produced from continuously printed layers. The printing of such continuous layers can be achieved by means of 3D screen printing with very little effort.

The supporting section can be generated as a whole from layers of different thicknesses. In particular, the printed layers, which are produced continuously with the layers of the membrane by means of 3D screen printing, can be formed differently in terms of their thickness from subsequently printed layers to achieve the respective desired overall height of the supporting section.

Further preferably, the membrane is fluid-tight, in particular gas-tight and/or liquid-tight. In particular, it is possible that the thickness and/or the material of the membrane and/or the number and/or the thickness of the layers of the membrane are selected to achieve fluid-tight, in particular gas-tight and/or liquid-tight, properties. In this way, the passage of gaseous or liquid media through the membrane of the shaped body can be reliably prevented, thus ensuring a high degree of operational safety.

According to a further preferred embodiment, the membrane can have, at least in sections, a rounded, in particular circular, outer circumferential shape. In such an embodiment of the membrane, the supporting section can have a rounded or circular inner circumferential shape. For example, the supporting section can be substantially annular in shape and can adjoin the membrane or merge into the membrane at its circular inner peripheral shape. Such a design of the membrane or the supporting section ensures uniform material stress in the transition area between the membrane and the supporting section, which means that load peaks in particular can be avoided.

Likewise, it is possible for the membrane to have an outer peripheral shape with at least one corner, in particular with a plurality of corners. In a preferred manner, the membrane may have a quadrangular or rectangular, in particular square, outer peripheral shape. Similarly, the membrane may have a triangular, pentagonal or hexagonal outer peripheral shape.

Membrane shapes with an angular outer circumference can enable improved pressure measurement of fluids during operation. In particular, the deformation of rectangles can be advantageous in the pressure measurement of fluids or enable increased measurement accuracy.

In a further preferred manner, at least one corner on the outer periphery of the membrane is free of radii of curvature or has a radius of curvature of less than 0.1 mm, in particular of less than 0.05 mm, less than 0.025 mm or less than 0.02 mm. Similarly, a corner may have a maximum radius of curvature of 0.25 mm or of less than 0.5 mm.

In a further preferred manner, the supporting section has an inner circumferential shape that corresponds to the outer circumferential shape of the membrane. In the case of a circular membrane, for example, the inner circumferential shape of the supporting section can also be circular, thus ensuring uniform force transmission from the membrane to the support section, as mentioned above. In contrast, in the case of a rectangular, in particular square, outer circumferential shape of the membrane, the inner circumferential shape of the supporting section can be rectangular or square.

It can be further advantageous if the support section, in particular a cross-section of the supporting section, has a rounded, in particular circular and/or cylindrical, outer circumferential shape at least in sections. Likewise, it is possible that the supporting section, in particular a cross-section of the supporting section, has an outer circumferential shape with at least one corner.

The supporting section advantageously runs around the membrane, in particular completely around the membrane. The supporting section can enclose and/or support the membrane completely and/or without interruption. The supporting section can be annular.

According to another embodiment, the outer peripheral shape of the supporting section may correspond to the inner peripheral shape of the supporting section, resulting in substantially constant wall thicknesses of the supporting section in the circumferential direction around the membrane. Similarly, it is possible for the outer peripheral shape of the supporting section to be different from the inner peripheral shape of the supporting section. For example, the inner circumferential shape of the supporting section may be square in cross-section and the outer circumferential shape may be round in cross-section, which may be advantageous, for example, with respect to installation space constraints. The shape of the inner circumference can thus be selected independently of the shape of the outer circumference, thereby achieving a higher degree of design flexibility.

Finally, the supporting section may have sections with different inner circumferential shapes along a longitudinal extent.

The supporting section can thus advantageously have sections with different inner circumferential shapes and/or inner circumferential dimensions along a longitudinal extension. The outer circumference of the membrane can be reproduced by a first section of the supporting section. A second section with an inner circumferential shape and/or dimension that differs from the first section and is constant in longitudinal extent can preferably form at least 25% of the longitudinal extent of the supporting section.

Longitudinal extension is understood here to mean a height direction of the shaped body. The longitudinal extension or height direction of the shaped body can run transverse to the extension of the membrane.

Accordingly, a change of course can be formed on the inner circumference of the supporting section in the height direction or longitudinal extension of the shaped body in an advantageous manner. A first section can reproduce the outer circumference of the membrane and/or surround it at least in sections. In this case, the first section can also project beyond the membrane in the longitudinal direction or height direction. Subsequently or at a distance from this first section, a second section can be provided with an inner circumferential shape and/or dimension that differs from the first section and is constant in longitudinal extension. This second section can form at least 25% of the longitudinal extent of the supporting section, i.e. build up relatively high.

By varying the inner circumferential shape and/or inner circumferential dimensions of the supporting section or by changing the course of the inner circumference of the support section, the functionality of the shaped body can be adapted particularly advantageously to the respective conditions of use. For example, a portion of the supporting section surrounding the membrane can define the outer geometry of the membrane or reproduce it. A further section of the supporting section can be designed with a view to rapid manufacturing, in particular on the basis of a minimum extension of 25% along a height direction of the supporting section. The manufacturing flexibility is improved in this way.

For example, the inner circumference can be formed by an angular section and an adjoining round section. In particular, the angular section can be adjacent to the membrane of the shaped body.

Possible receptacles for sealing elements are not to be regarded as a variation of the inner circumferential shape and/or dimension, since they extend only over a small height of the supporting section. In particular, a portion defining a seal receptacle forms less than 25% of the longitudinal extent of the support section.

According to a preferred embodiment, the second portion of the supporting section may form at least 30%, preferably 35%, more preferably 40%, more preferably 45%, more preferably 50%, still more preferably 55%, still more preferably 60%, of the longitudinal extent of the supporting section. Manufacturing efficiency can be improved in this way.

According to a particularly preferred embodiment, the greatest possible distance between two points lying on the outer circumference of the membrane may be less than 18 mm, preferably less than 17 mm, preferably less than 16 mm, in particular about 15 mm. Likewise, a corresponding distance may be less than 15 mm, for example less than 10 mm, preferably less than 8 mm, preferably less than 6 mm, preferably less than 5 mm, preferably less than 4.5 mm or less than 4 mm.

Furthermore, it is possible that the largest possible distance between two points lying on the outer circumference of the membrane is greater than 2 mm, preferably greater than 3 mm, more preferably greater than 4 mm, still more preferably greater than 5 mm or greater than 8 mm or greater than 10 mm.

On the one hand, such membrane dimensions ensure a relatively small design. At the same time, membranes with such dimensions can be manufactured reproducibly in high quality.

The greatest possible distance between two points lying on the outer circumference of the membrane may in particular concern a diameter or a diagonal of the membrane, in particular a diameter or a diagonal of the membrane in a plan view of the membrane. The greatest possible distance between two points lying on the outer circumference of the membrane relates in particular to points lying on a plane of the membrane, in particular a plane running on or parallel to a membrane surface.

According to a further advantageous embodiment, in a cross-section of the supporting section, the greatest possible distance between two points lying on the outer circumference of the supporting section may be less than 25 mm, preferably less than 22 mm, preferably less than 20 mm, more preferably less than 15 mm, more preferably less than 12 mm, more preferably less than 10 mm, still more preferably less than 9.5 mm, still more preferably about 9 mm or less than 9 mm.

Furthermore, in an advantageous manner, in a cross-section of the support section, the greatest possible distance between two points lying on the outer circumference of the supporting section can be greater than 5 mm, preferably greater than 7 mm, preferably greater than 8 mm or greater than 10 mm.

A supporting section dimensioned in this way can ensure sufficient stability on the one hand and at the same time ensure a compact size. The largest possible distance between two points on the outer circumference of the supporting section can be a diameter or a diagonal. The greatest possible distance between two points lying on the outer circumference of the supporting section relates in particular to points lying on a plane of the supporting section, in particular a plane running orthogonally to the longitudinal extent of the supporting section. Moreover, such a plane can run on and/or parallel to a membrane surface.

According to a further preferred embodiment, the membrane can have a height and/or thickness structuring. This can be understood to mean variations in the thickness or the extension of the membrane in the height direction of the shaped body. Accordingly, the membrane can have portions with different thicknesses and/or with different thicknesses and/or extensions in the height direction of the shaped body. The deformation behavior of the membrane can thus be influenced in a suitable manner.

According to a further preferred embodiment, a plurality of membranes can be provided. In particular, the membranes can be separated from each other and/or spaced apart. The different membranes can be separated from each other by a material portion of the supporting section. The different membranes may extend along a common plane and/or be spaced apart from one another transversely to the height direction of the shaped body. The membranes can be used in operation for different measuring purposes, in particular for different measuring ranges.

In a further preferred manner, the membrane and/or the supporting section can be printed with at least one circuit path. A circuit path generated by means of 3D screen printing can be arranged on the membrane and/or on the supporting section. The manufacturing effort can be further reduced in this way, since not only the membrane or the supporting section is produced in 3D screen printing, but also a circuit path required in each case for sensor operation.

A further independent aspect of the present invention relates to a shaped body, in particular for a pressure sensor, having a membrane and a supporting section supporting the membrane, the membrane and the supporting section being produced at least in sections from a ceramic material by additive manufacturing, in particular by 3D screen printing, and, in a cross section of the supporting section, the greatest possible distance between two points lying on the outer circumference of the supporting section being less than 25 mm, in particular less than 20 mm.

A still further independent aspect of the present invention relates to a shaped body, in particular for a pressure sensor, having a membrane and having a supporting section supporting the membrane, the membrane being produced at least in sections from a ceramic material by additive manufacturing, in particular by 3D screen printing, and having at least in sections a thickness of less than 0.5 mm.

A still further independent aspect of the present invention relates to a shaped body, in particular for a pressure sensor, having a membrane and having a supporting section supporting the membrane, the membrane and the supporting section being produced at least in sections from a ceramic material by additive manufacturing, in particular by 3D screen printing, and the membrane having at least in sections a thickness of less than 0.5 mm.

A still further independent aspect of the present invention relates to a shaped body, in particular for a pressure sensor, having a membrane and having a supporting section carrying the membrane, the membrane being produced at least in sections from a ceramic material by additive manufacturing, in particular by 3D screen printing, and having an outer circumferential shape with at least one corner.

A still further independent aspect of the present invention relates to a shaped body, in particular for a pressure sensor, having a membrane and having a supporting section supporting the membrane, the membrane and the supporting section being produced at least in sections from a ceramic material by additive manufacturing, in particular by 3D screen printing, and the membrane having an outer circumferential shape with at least one corner.

A still further independent aspect of the present invention relates to a shaped body, in particular for a pressure sensor, having a membrane and having a supporting section supporting the membrane, the membrane being produced at least in sections from a ceramic material by additive manufacturing, in particular by 3D screen printing, and having a height and/or thickness structuring.

A still further independent aspect of the present invention relates to a shaped body, in particular for a pressure sensor, having a membrane and having a supporting section supporting the membrane, the membrane and the supporting section being produced at least in sections from a ceramic material by additive manufacturing, in particular by 3D screen printing, and the membrane having a height and/or thickness structuring.

A still further independent aspect of the present invention relates to a shaped body, in particular for a pressure sensor, having a plurality of membranes and having a supporting section supporting the membrane, the plurality of membranes and the supporting section being produced at least in sections from a ceramic material by additive manufacturing, in particular by 3D screen printing, and the membranes being designed to be separate from one another and/or spaced apart.

A still further independent aspect of the present invention relates to a shaped body, in particular for a pressure sensor, having a membrane and having a supporting section supporting the membrane, the supporting section being produced at least in sections from a ceramic material by additive manufacturing, in particular 3D screen printing, and the supporting section having portions with different inner circumferential shapes and/or dimensions along a longitudinal extent, a first portion of the supporting section forming the outer circumference of the membrane and a second portion with an inner circumferential shape and/or dimension which differs from the first portion and is constant in the longitudinal extent forming at least 25% of the longitudinal extent of the supporting section.

A still further independent aspect of the present invention relates to a shaped body, in particular for a pressure sensor, having a membrane and having a supporting section supporting the membrane, the membrane and the supporting section being produced at least in sections from a ceramic material by additive manufacturing, in particular 3D screen printing, and the supporting section having portions with different inner circumferential shapes and/or dimensions along a longitudinal extent, a first portion of the supporting section forming the outer circumference of the membrane and a second portion with an inner circumferential shape and/or dimension which differs from the first portion and is constant in longitudinal extent forming at least 25% of the longitudinal extent of the supporting section.

The present invention also relates to a pressure sensor, in particular for measuring the pressure of fluids, with a shaped body as described above and with an electrical arrangement by means of which a deformation of the membrane can be detected. Such an electrical arrangement can, for example, be arranged on the membrane or the supporting section.

Finally, the present invention also relates to a pressure sensor, in particular for measuring the pressure of fluids, having a shaped body which has a membrane and a supporting section which supports the membrane, the membrane and the supporting section being produced at least in sections from a ceramic material by additive manufacturing, in particular by 3D screen printing.

Finally, a still further independent aspect of the present invention relates to a sensor body, in particular for a pressure sensor, having a membrane and having a supporting section supporting the membrane, the membrane and the supporting section being produced at least in sections from a ceramic material by 3D screen printing.

Finally, the present invention also relates to a method for producing a shaped body, in particular a shaped body and/or sensor body described above, in which a membrane and a supporting section carrying the membrane are produced at least in sections by means of 3D screen printing, and the maximum possible distance between two points lying on the outer circumference of the membrane is less than 20 mm.

Finally, the present invention also relates to a method for producing a shaped body, in particular a shaped body and/or sensor body described above, in which a membrane with a thickness of less than 0.5 mm and a supporting section supporting the membrane are produced at least in sections by 3D screen printing.

In an advantageous manner, the membrane and/or the supporting section can be post-processed, in particular mechanically post-processed, before a sintering process. Accordingly, the shaped body can first be printed and then dried, and mechanical finishing can then be carried out before any sintering. Accordingly, the green body, which has not yet been sintered, can be mechanically reworked, which can be done with little effort due to the still low hardness.

The details described above with respect to the shaped body also apply equally to the method according to the invention, to the pressure sensors described above, and also to shaped bodies and/or sensor bodies according to the further independent aspects of the present invention also mentioned above.

BRIEF DESCRIPTION OF THE DRAWINGS

In the following, the invention is described by way of example on the basis of advantageous embodiments with reference to the accompanying drawings. Shown schematically in each case.

DETAILED DESCRIPTION

Figure 1:
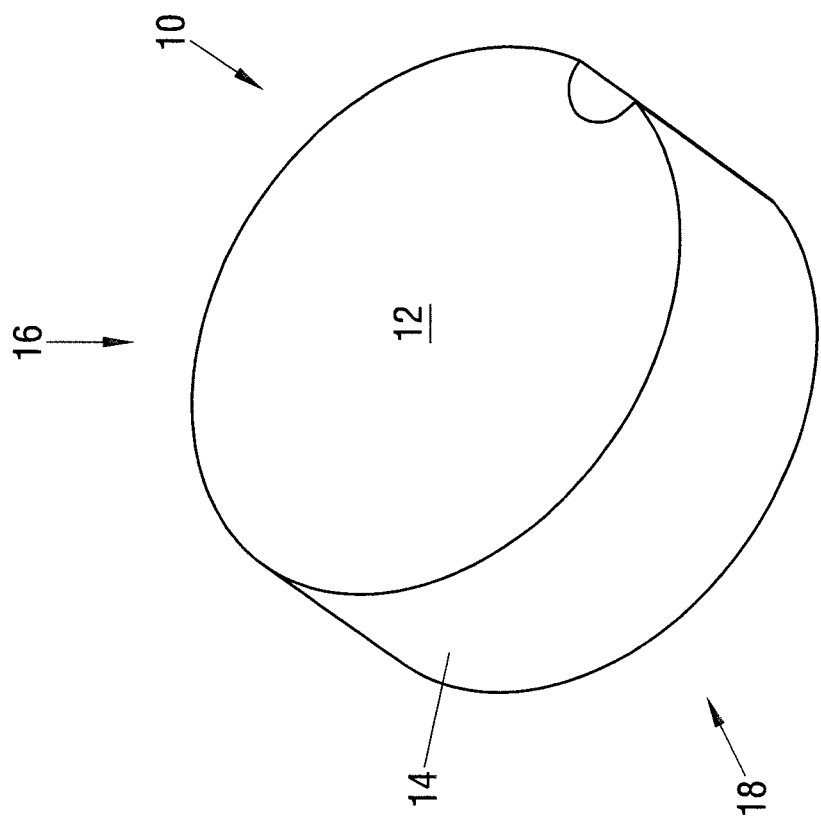
FIG. 1 a perspective view of a shaped body according to the invention from a top side, FIG. 2 a perspective view of a shaped body according to the invention from a lower side, FIG. 3 a bottom view of a shaped body according to FIGS. 1 and 2, FIG. 4 a top view of a shaped body according to FIGS. 1 to 3, FIG. 5 a longitudinal sectional view of a shaped body according to FIGS. 1 to 4, FIG. 6 a detailed view A of FIG. 5, FIG. 7 a perspective view of a shaped body according to the invention from a lower side according to a further embodiment, FIG. 8 a bottom view of a shaped body according to FIG. 7, FIG. 9 a perspective view of a shaped body according to the invention from a lower side according to a still further embodiment, FIG. 10 a bottom view of a shaped body according to FIG. 9, FIG. 11 a perspective view of a shaped body according to the invention from a lower side according to a still further embodiment, FIG. 12 a bottom view of a shaped body according to FIG. 11, FIG. 13 a longitudinal sectional view of a shaped body according to FIGS. 11 and 12, FIG. 14 a perspective view of a shaped body according to the invention from a lower side according to a still further embodiment, FIG. 15 a bottom view of a shaped body according to FIG. 14, FIG. 16 a longitudinal sectional view of a shaped body according to FIGS. 14 and 15, FIG. 17 a perspective view of a shaped body according to the invention from a lower side according to a still further embodiment, FIG. 18 a bottom view of a shaped body according to FIG. 17, FIG. 19 a longitudinal sectional view of a shaped body according to FIGS. 17 and 18, FIG. 20 a perspective view of a shaped body according to the invention from a lower side according to a still further embodiment, FIG. 21 a bottom view of a shaped body according to FIG. 20, FIG. 22 a longitudinal sectional view of a shaped body according to FIGS. 20 and 21, FIG. 23 a perspective view of a shaped body according to the invention from a lower side according to a still further embodiment, FIG. 24 a bottom view of a shaped body according to FIG. 23, FIG. 25 a longitudinal sectional view of a shaped body according to FIGS. 23 and 24, FIG. 26 a perspective view of a shaped body according to the invention from a lower side according to a still further embodiment, FIG. 27 a bottom view of a shaped body according to FIG. 26, FIG. 28 a longitudinal sectional view of a shaped body according to FIGS. 26 and 27, FIG. 29 a perspective view of a shaped body according to the invention from a lower side according to a still further embodiment, FIG. 30 a bottom view of a shaped body according to FIG. 29, FIG. 31 a longitudinal sectional view of a shaped body according to FIGS. 29 and 30, FIG. 32 a perspective view of a shaped body according to the invention from a lower side according to a still further embodiment, FIG. 33 a bottom view of a shaped body according to FIG. 32, FIG. 34 a longitudinal sectional view of a shaped body according to FIGS. 32 and 33.
Figure 2:
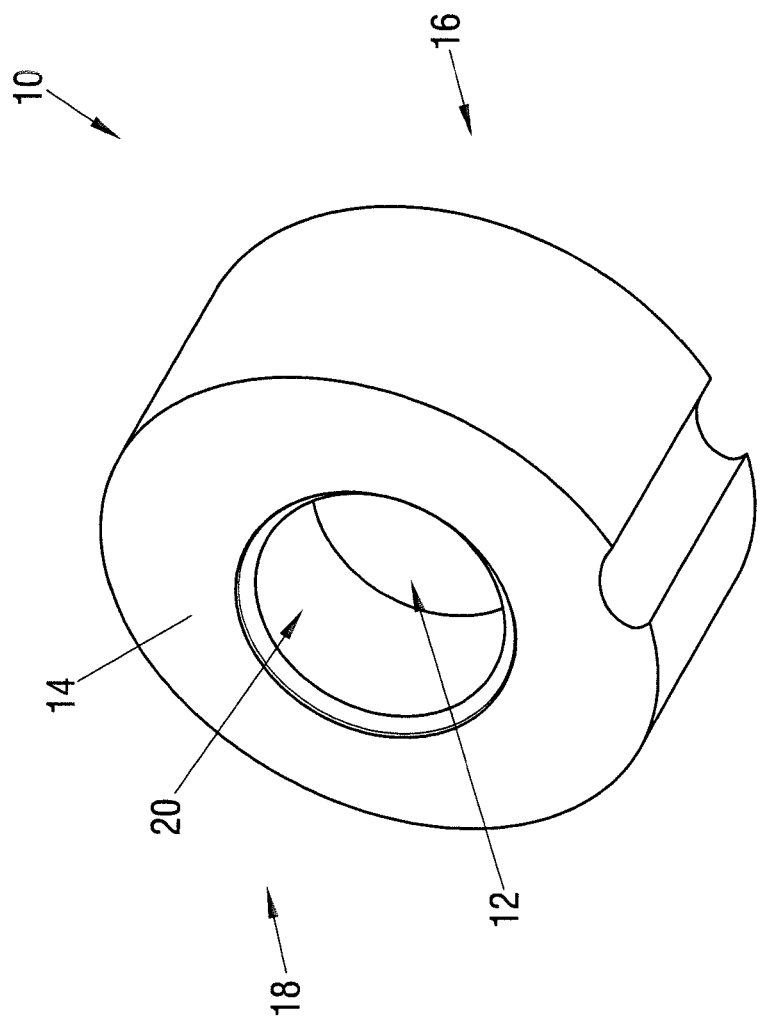
Figure 3:
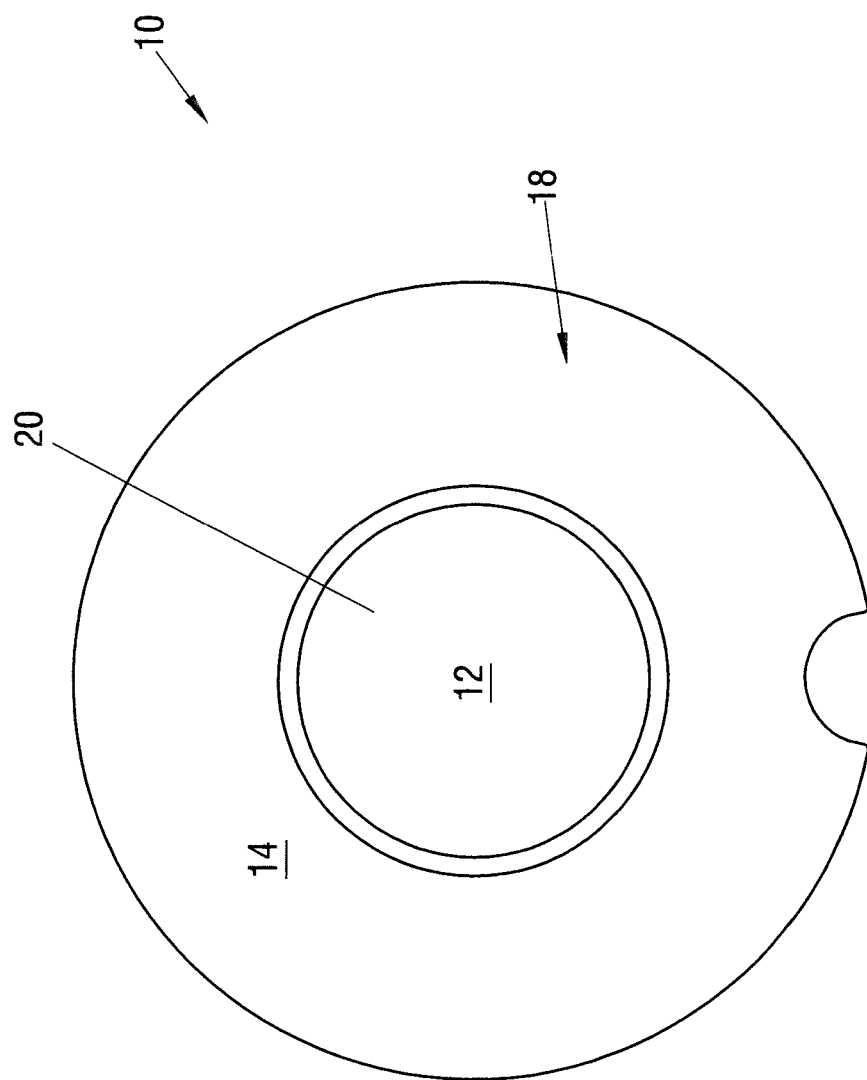

FIGS. 1 and 2 show perspective views of a shaped body 10 according to an embodiment of the invention. FIGS. 3 to 6 show further illustrations of the shaped body 10 according to the embodiment in FIGS. 1 and 2. Further embodiments of the shaped body 10 are shown in FIGS. 7 to 13 and also in FIGS. 14 to 34.

A shaped body 10 shown in FIGS. 1 to 34 is particularly suitable for use in pressure sensors for measuring fluid pressures. The shaped body 10 is advantageously a sensor body, in particular a sensor body for a pressure sensor.

As can be seen from FIGS. 1 to 34, the shaped body 10 has a membrane 12 and a supporting section 14 supporting the membrane. In the exemplary embodiment according to FIGS. 1 to 6, the membrane 12 is circular. The embodiments according to FIGS. 7 to 34 differ from the embodiment according to FIGS. 1 to 6 essentially in the shape of the membrane 12 and/or in the number of membranes, which will be explained in more detail below. For example, according to FIGS. 7 to 16, a membrane 12 with an angular outer circumferential shape is provided. According to FIGS. 17 to 34, further membrane shapes or membrane designs are provided.

The membrane 12 can be produced at least in sections by means of additive manufacturing, in particular by means of 3D screen printing. Likewise, the supporting section 14 can be produced by means of additive manufacturing, in particular 3D screen printing. The membrane 12 and the supporting section 14 are preferably formed in one piece and/or form a monolithic body.

In a preferred manner, the membrane 12 and/or the supporting section 14 are manufactured entirely by means of 3D screen printing. Furthermore, the membrane 12 and/or the supporting section 14 can be produced exclusively by means of 3D screen printing, in particular free of mechanical post-processing.

The membrane 12 has, at least in sections, a thickness of less than 0.5 mm, more preferably less than 0.4, less than 0.35, less than 0.3, less than 0.25, preferably less than 0.225, and more preferably less than 0.2 mm. Similarly, the membrane may have, at least in sections, a thickness greater than 0.1 mm, preferably greater than 0.15 mm, more preferably greater than 0.175 mm or greater than 0.2 mm. According to the embodiments in FIGS. 23 to 31, greater thicknesses may also be provided in sections, which will be described further below.

On an upper side 16 of the shaped body 10, the supporting section 14 is flush with the membrane 12. In contrast, on a lower side 18 of the shaped body 10, the supporting section 14 protrudes with respect to the membrane 12, so that a cavity 20 is formed inside the supporting section 14. The cavity 20 is bounded towards the upper side 16 of the shaped body 10 by the membrane 12. At the bottom side 18 of the shaped body 10, the cavity 20 is open.

The upper side 16 can be a side facing away from the media. The bottom side 18, on the other hand, can be a media-facing side or a media side of the shaped body 10.

Figure 5:
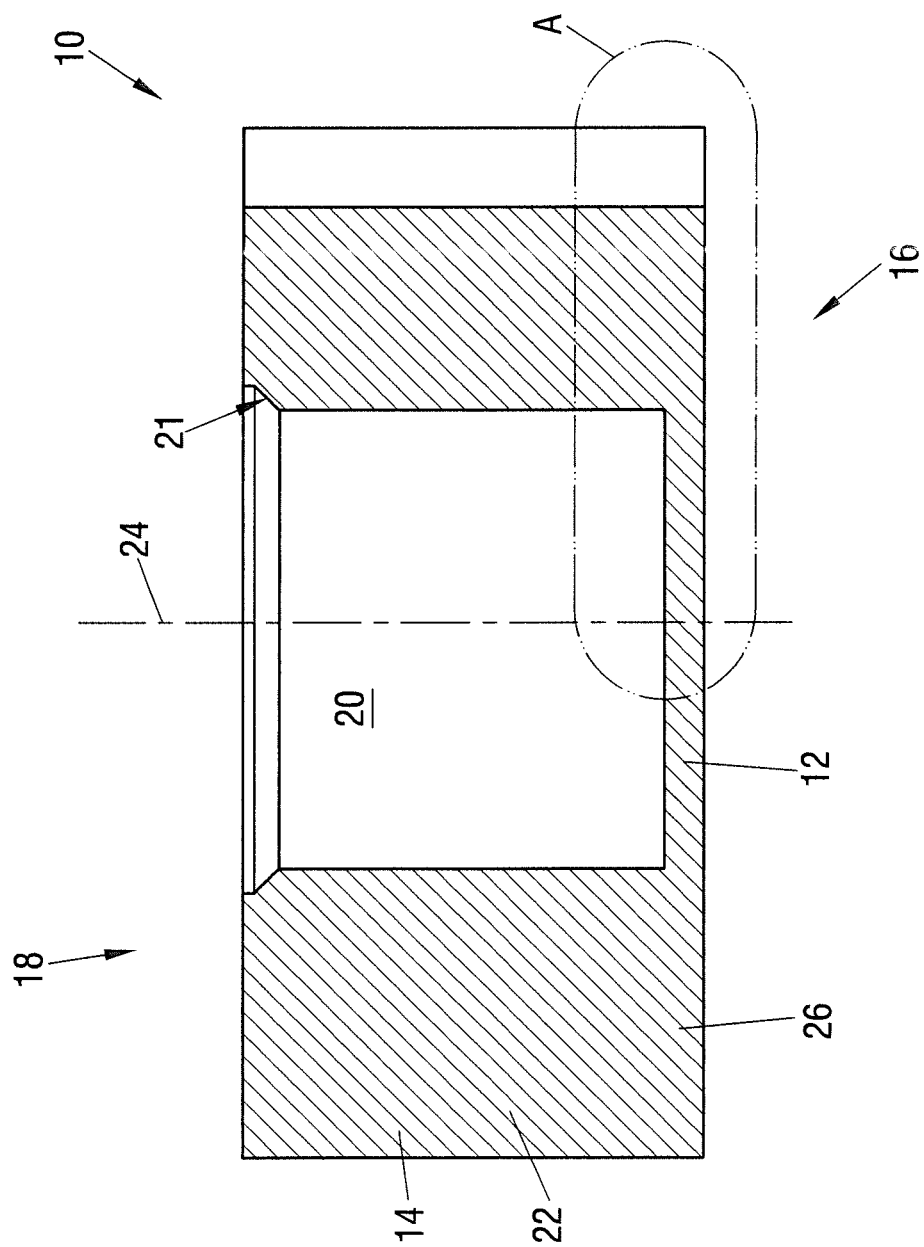

A receptacle 21 for a sealing ring or O-ring can be formed on the underside 18 facing the medium, as can be seen in the longitudinal sectional view of FIG. 5. The receptacle 21 is preferably formed on an inner circumference of the supporting section 14. In particular, the receptacle 21 can be formed as a bevel or chamfer extending all around.

Advantageously, the membrane 12 may comprise at least three layers printed by the 3D screen printing method. Preferably, the membrane 12 may comprise fifteen layers at the most. According to the embodiments in FIGS. 23 to 31, more than fifteen layers may be provided in sections, which will be further described below.

Figure 6:
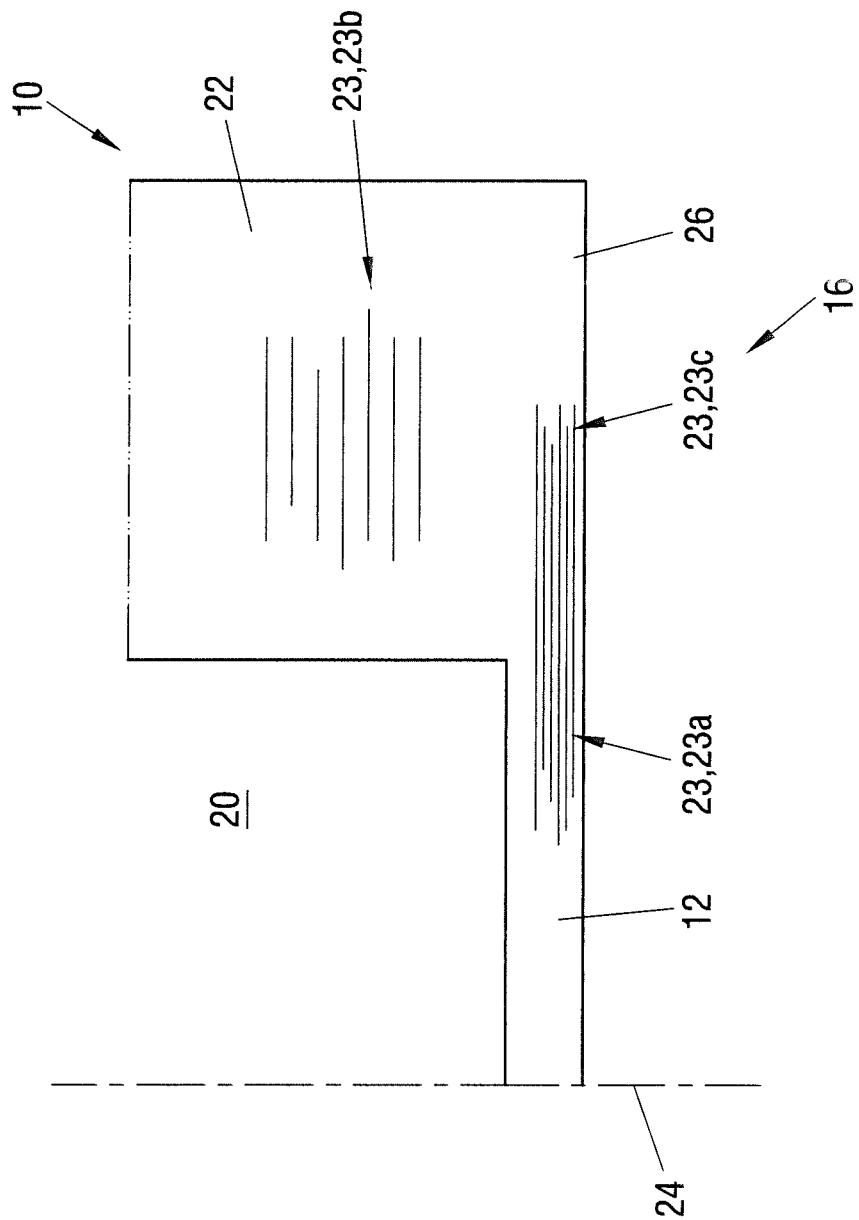

FIG. 6 schematically shows illustrations of different layers 23 of the membrane 12 and of the supporting section 14. The thickness of the individual layers 23a of the membrane 12 can be less than the thickness of at least one layer 23b of the supporting section 14. This applies in particular to regions 22 of the supporting section 14 that project along a height direction 24 or along a longitudinal extent of the shaped body 10 relative to the membrane 12.

In FIG. 6, it can further be seen that regions 26 of the supporting section 14 surrounding the membrane 12 in the circumferential direction may have a layer thickness identical to the respective layer thicknesses of the membrane 12. In particular, the respective layers 23a of the membrane 12 may be continuous with the layers 23c for forming the region 26 of the supporting section 14 surrounding the membrane 12 in the circumferential direction. Although not shown in detail, such a formation of the layers may be provided in all embodiments.

Figure 7:
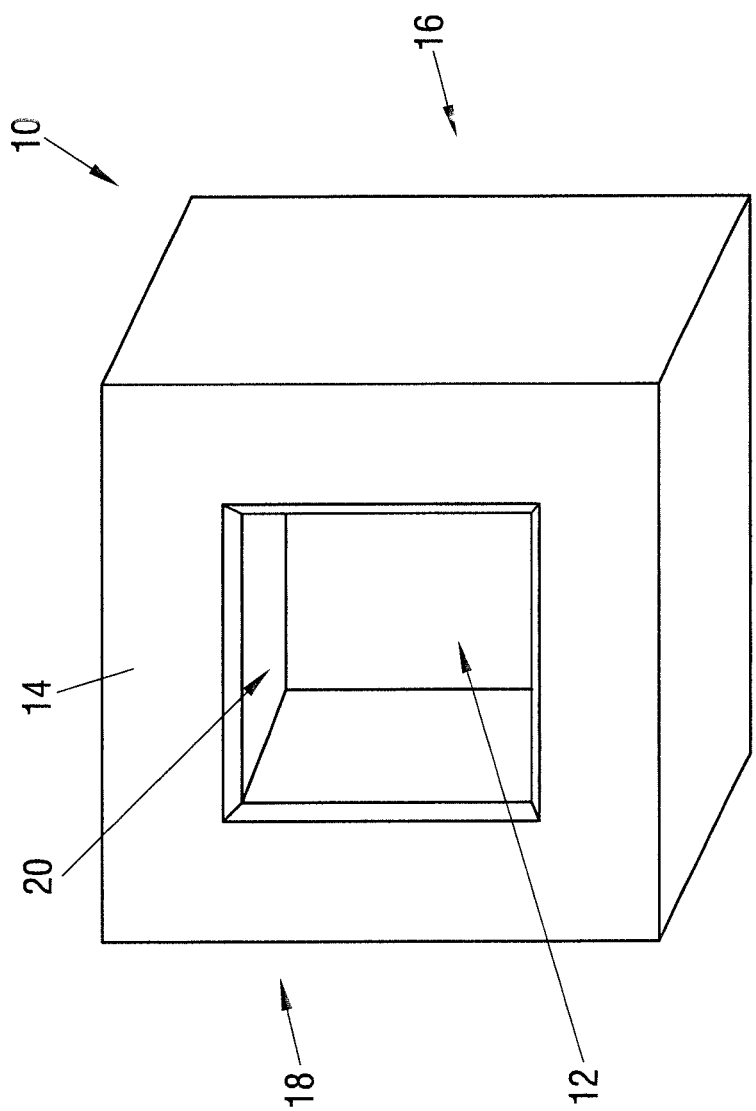
Figure 8:
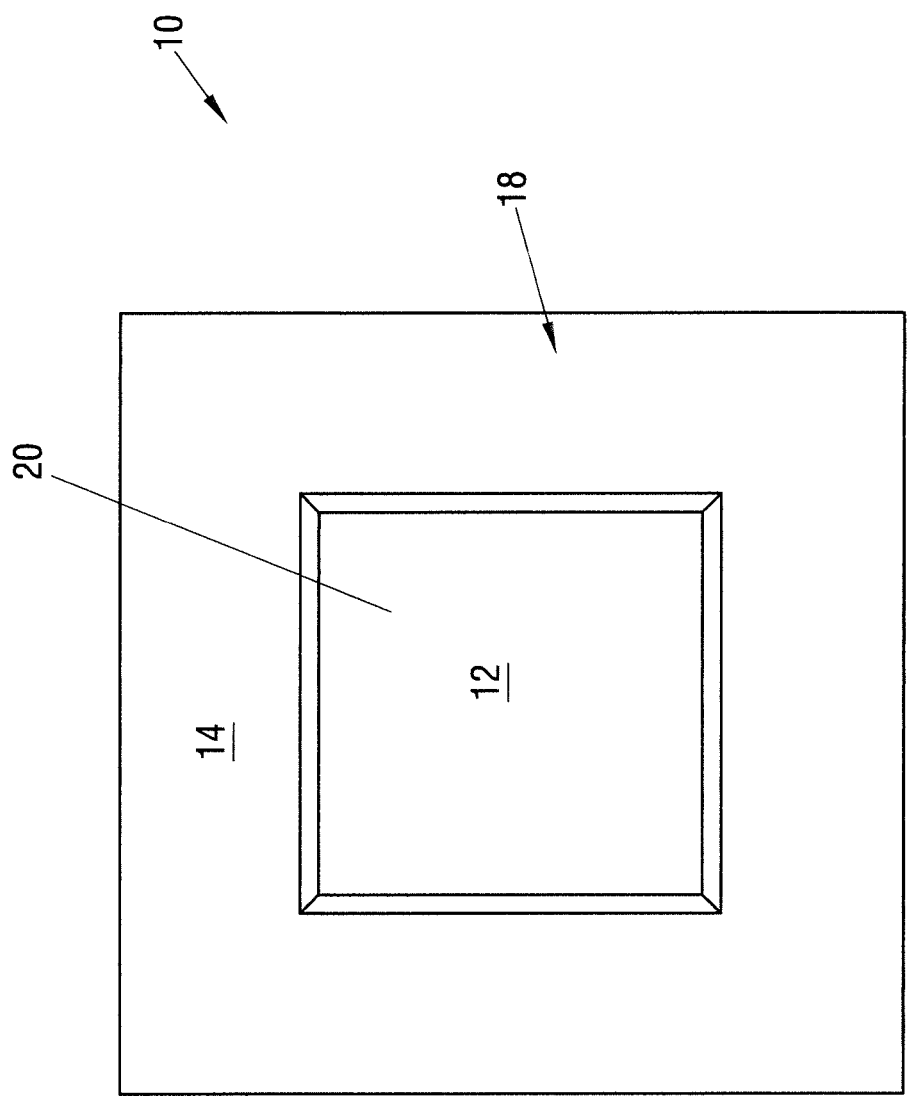

As mentioned above, the supporting section 14 can surround the membrane 12, in particular surround it all around. The supporting section 14 may be circular in shape, in particular having a circular outer circumferential shape, as shown, for example, in FIGS. 1 to 4 and 9 to 34. The circular outer circumferential shape may be interrupted by an indentation on the outer circumference. Similarly, the supporting portion 14 may have an angular outer peripheral shape, such as shown in FIGS. 7 and 8. Although not shown in more detail, the embodiments according to FIGS. 1 to 4 and 9 to 34 may also be provided with an angular outer circumferential shape of the supporting section 14.

The inner circumferential shape of the supporting section 14 can correspond at least in sections to the outer circumferential shape of the membrane 12. When the outer circumferential shape of the membrane 12 is circular, the inner circumferential shape of the supporting section 14 may, at least in sections, also be circular, as shown in FIGS. 1 to 4, for example. When the outer circumferential shape of the membrane 12 is angular, the inner circumferential shape of the supporting section 14 may, at least in sections, also be angular, as shown, for example, in FIGS. 7 to 12.

The membrane 12, when circularly configured as shown in FIGS. 1 to 6, may have a diameter that is less than 18 mm, preferably less than 16 mm, more preferably about 15 mm, more preferably less than 15 mm, more preferably less than 12 mm, more preferably less than 10 mm, more preferably less than 8 mm, more preferably less than 6 mm, more preferably less than 4.5 mm, even more preferably less than 4 mm.

In the case of rectangular or square membrane outer circumference shapes according to FIGS. 7 to 13, the preceding values can refer to a possible diagonal of the membrane 12, in particular a diagonal in a plan view of the membrane 12. This can correspondingly also be the case for the other membrane shapes shown in FIGS. 14 to 34.

Figure 4:
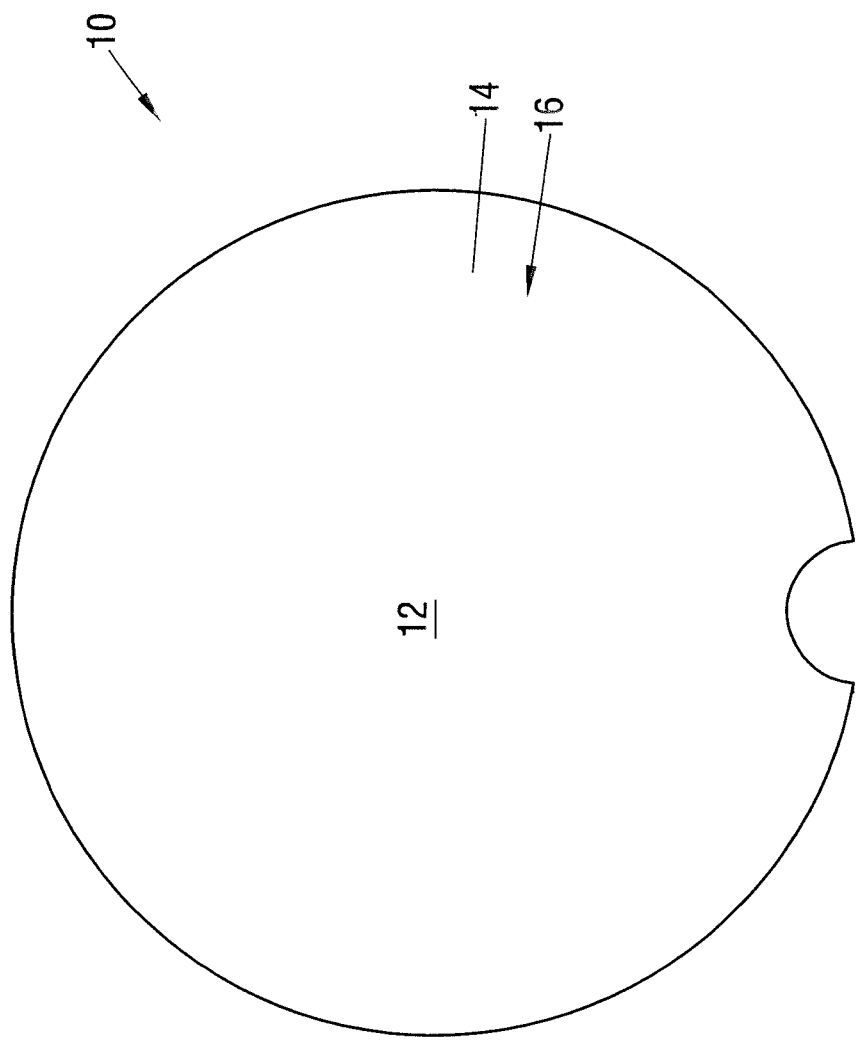

In a cross-section or bottom view from the bottom side 18 onto the support section, as for example shown in FIGS. 3, 10, 12, 15, 18, 21, 24, 27, 30 and 33, and/or in a top view from the top side 16, as for example shown in FIG. 4, an outer diameter of the supporting section may be smaller than 25 mm, preferably smaller than 22 mm, more preferably smaller than 20 mm, more preferably smaller than 15 mm, more preferably smaller than 12 mm, more preferably smaller than 10 mm, even more preferably smaller than 9.5 mm, even more preferably about 9 mm or smaller than 9 mm.

In the case of rectangular or square outer circumferential shapes of the supporting section 14, as shown in FIGS. 7 and 8, the preceding values may refer to a diagonal, in particular in an upper view of the shaped body 10 and/or in a lower view of the shaped body 10.

In the embodiment shown in FIGS. 7 and 8, the membrane 12 has a square outer peripheral shape. The supporting section 14 has both a square outer peripheral shape and a square inner peripheral shape. The square inner circumferential shape is constant along the longitudinal extent of the supporting section 14.

Figure 9:
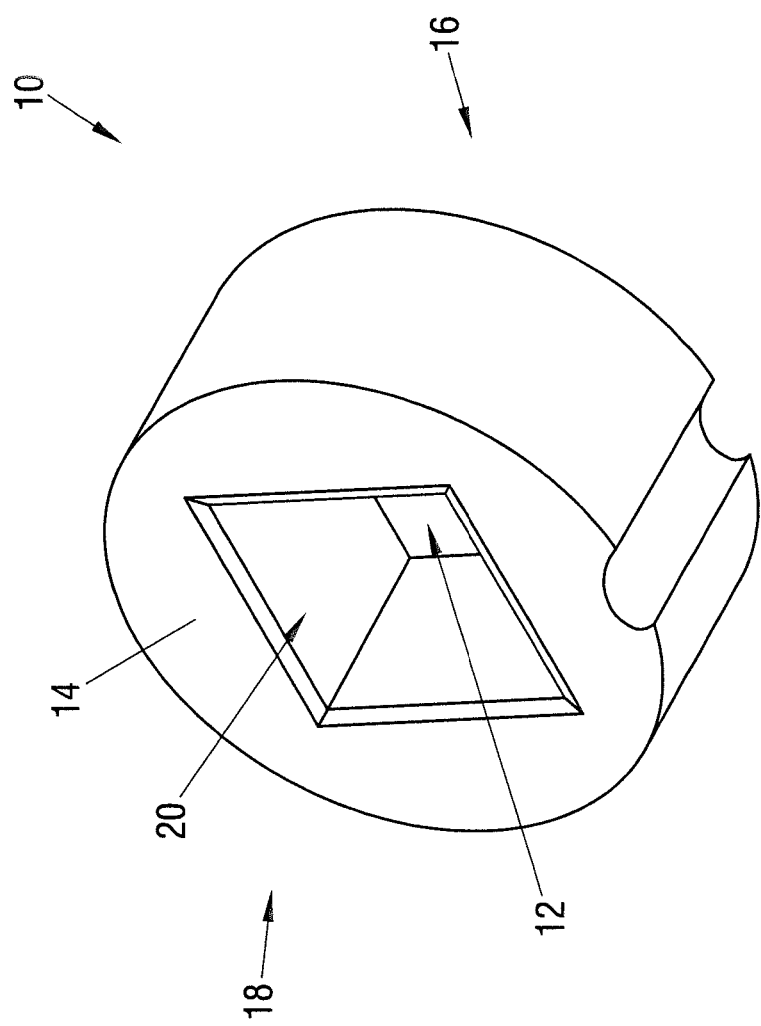
Figure 10:
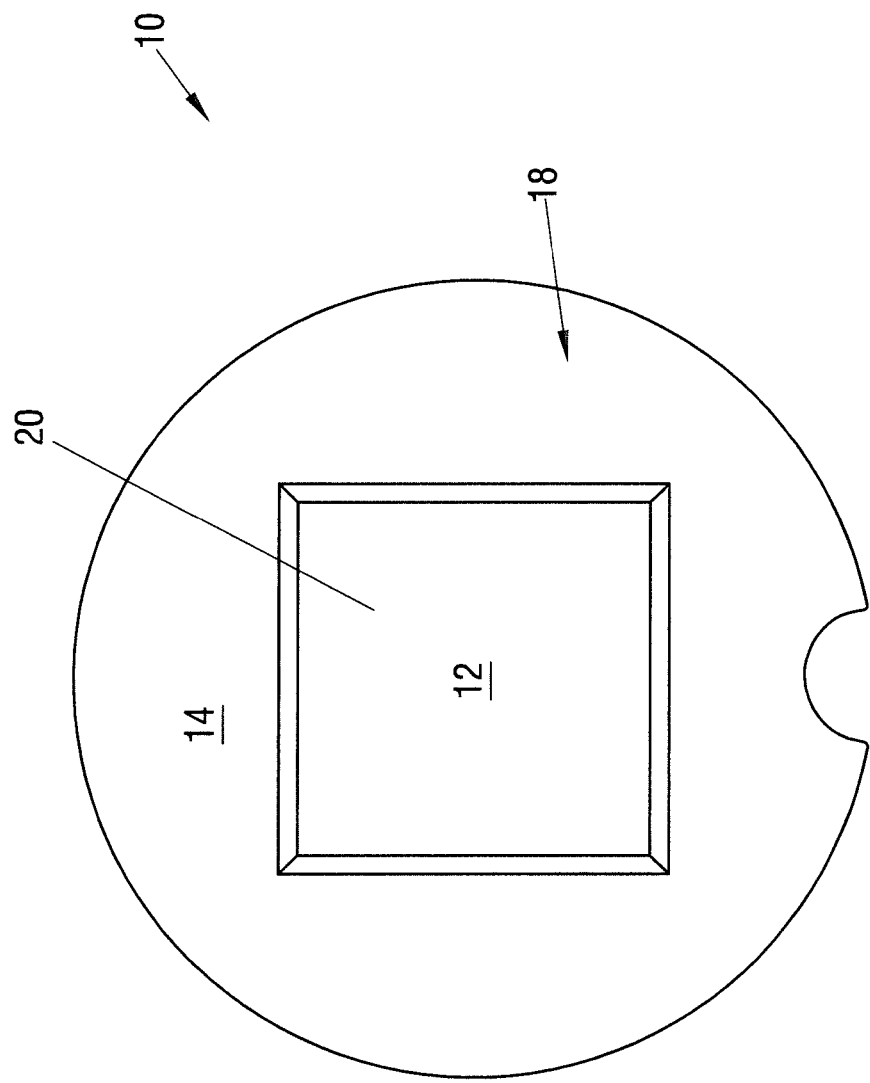

In the embodiment shown in FIGS. 9 and 10, the membrane 12 also has a square outer peripheral shape. The supporting section 14 has a square inner peripheral shape but a circular outer peripheral shape. The square inner circumferential shape is constant along the longitudinal extent of the supporting section 14.

Figure 11:
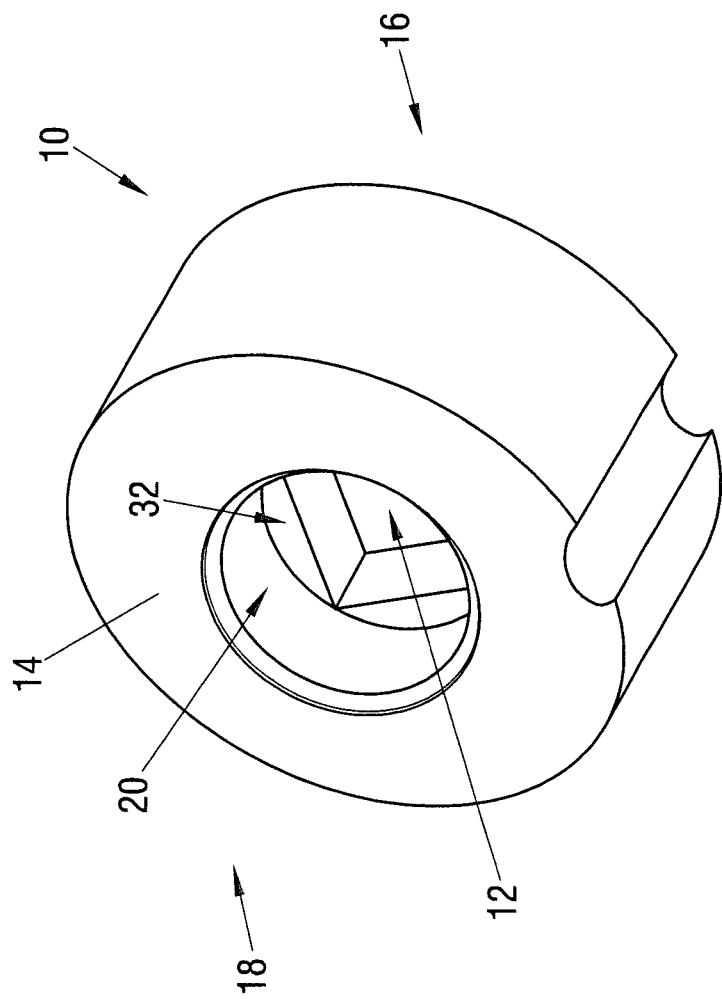
Figure 12:
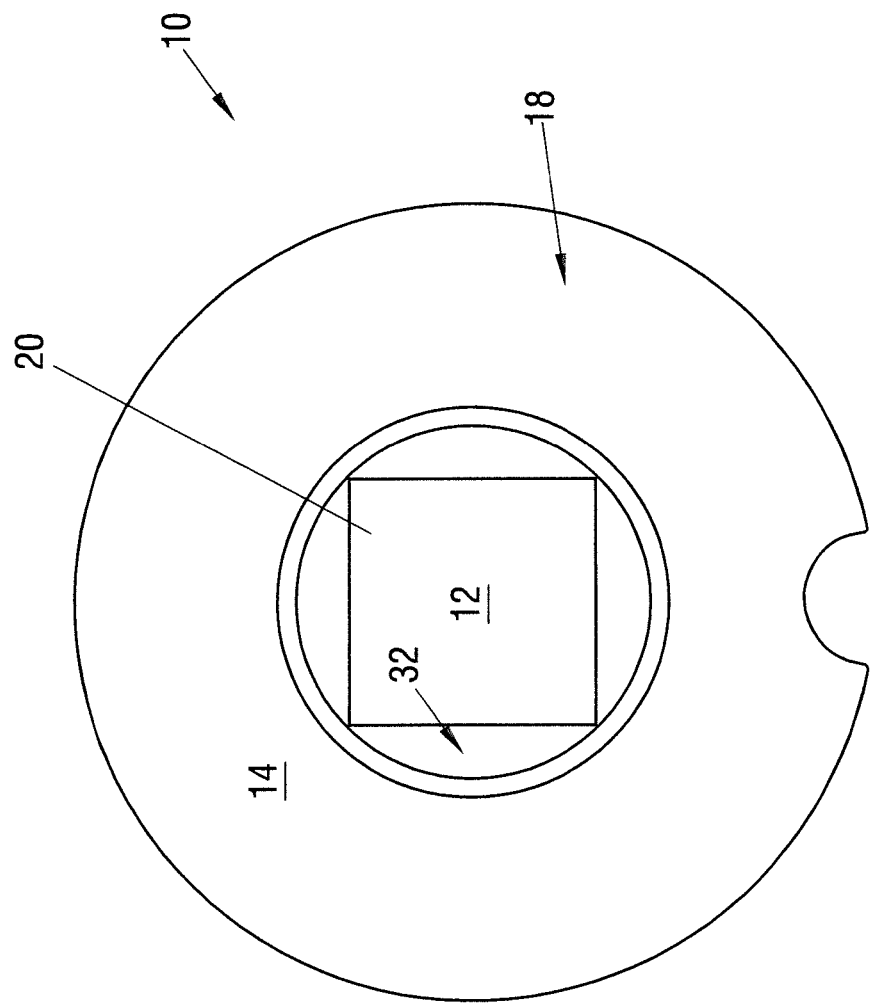
Figure 13:
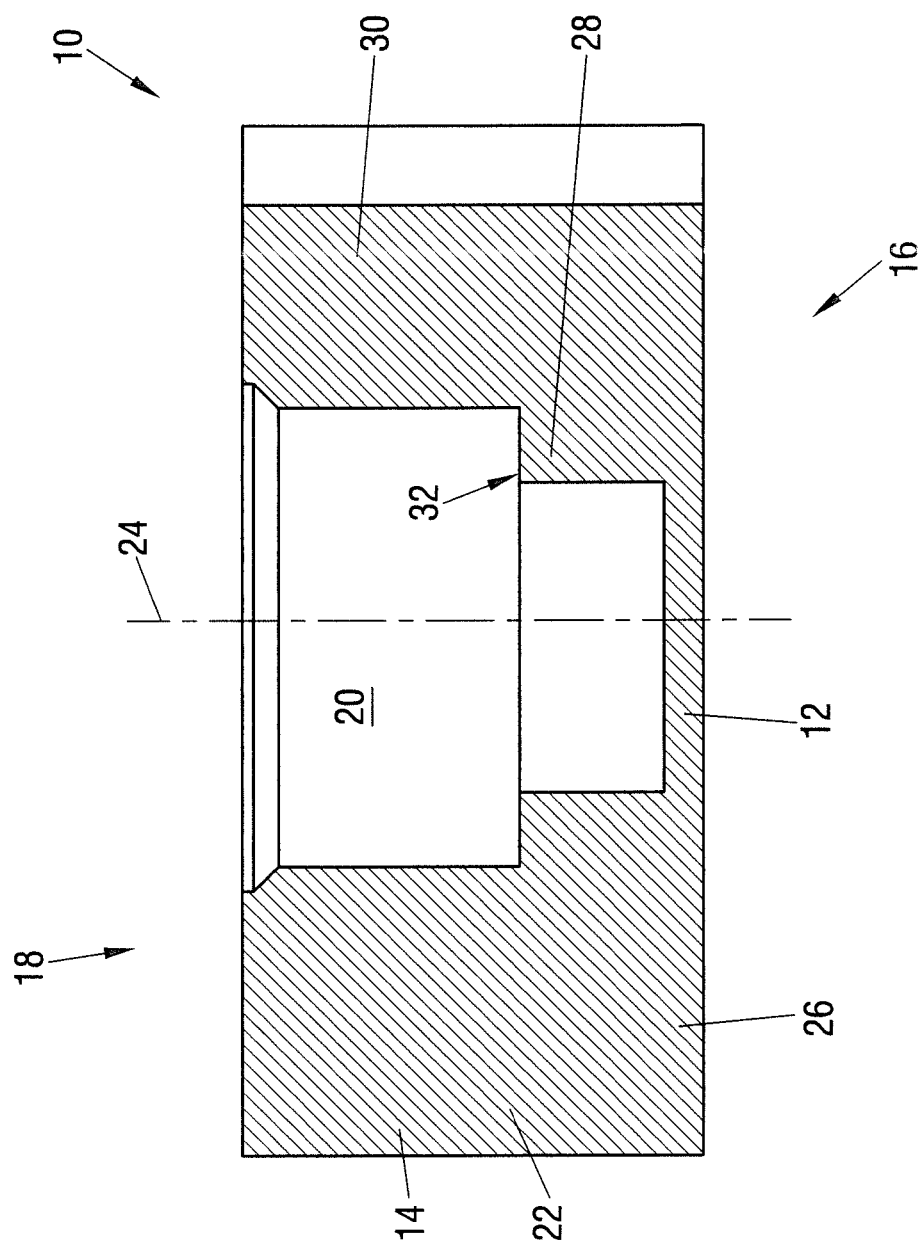

In the embodiment according to FIGS. 11 to 13, the membrane 12 also has a square outer circumferential shape. The supporting section 14 has a circular outer circumferential shape and different inner circumferential shapes along its longitudinal extension. For example, the inner peripheral shape of the supporting section 14 is square in a portion 28 surrounding the membrane 12. The portion 28 having the square inner peripheral shape protrudes above the membrane 12 in the height direction 24. A portion 30 having a circular inner circumferential shape adjoins the portion 28 having the square inner circumferential shape. This results in a step 32 at the inner circumference of the supporting section 14.

Figure 14:
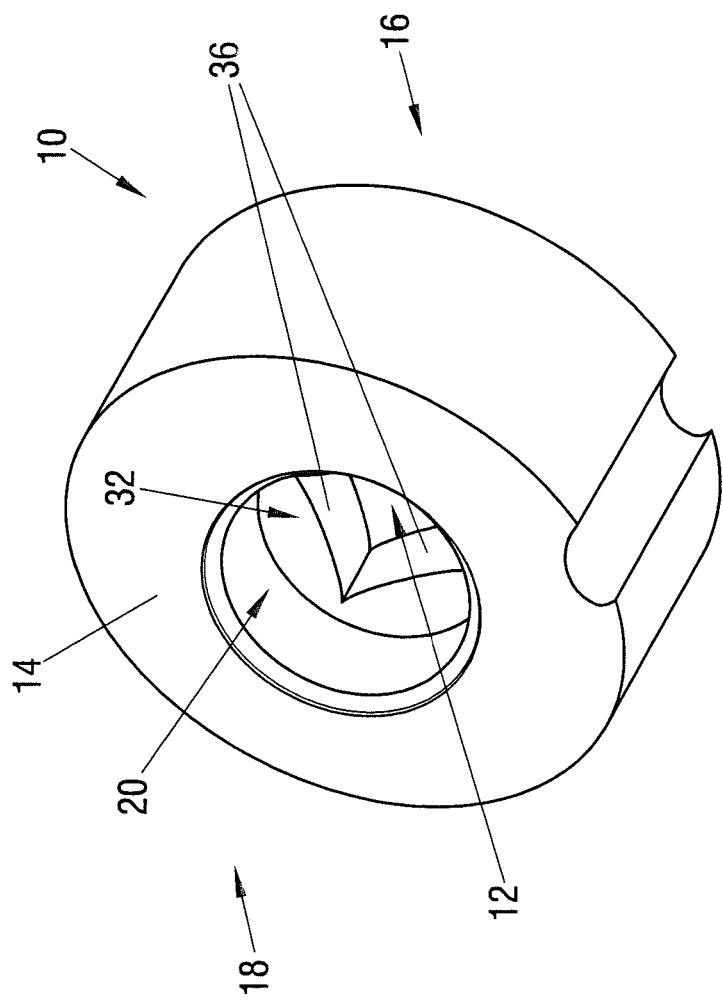
Figure 15:
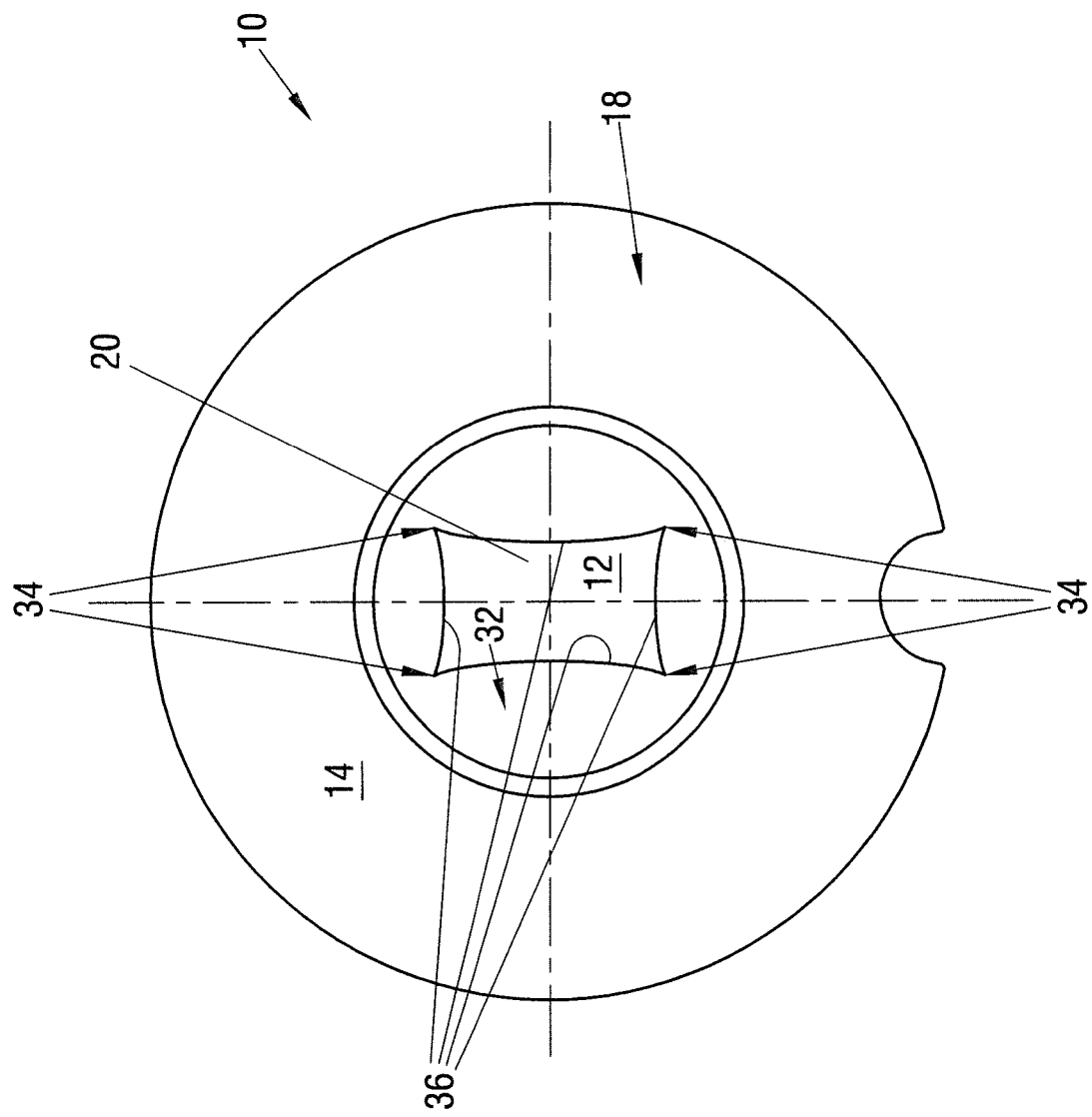
Figure 16:
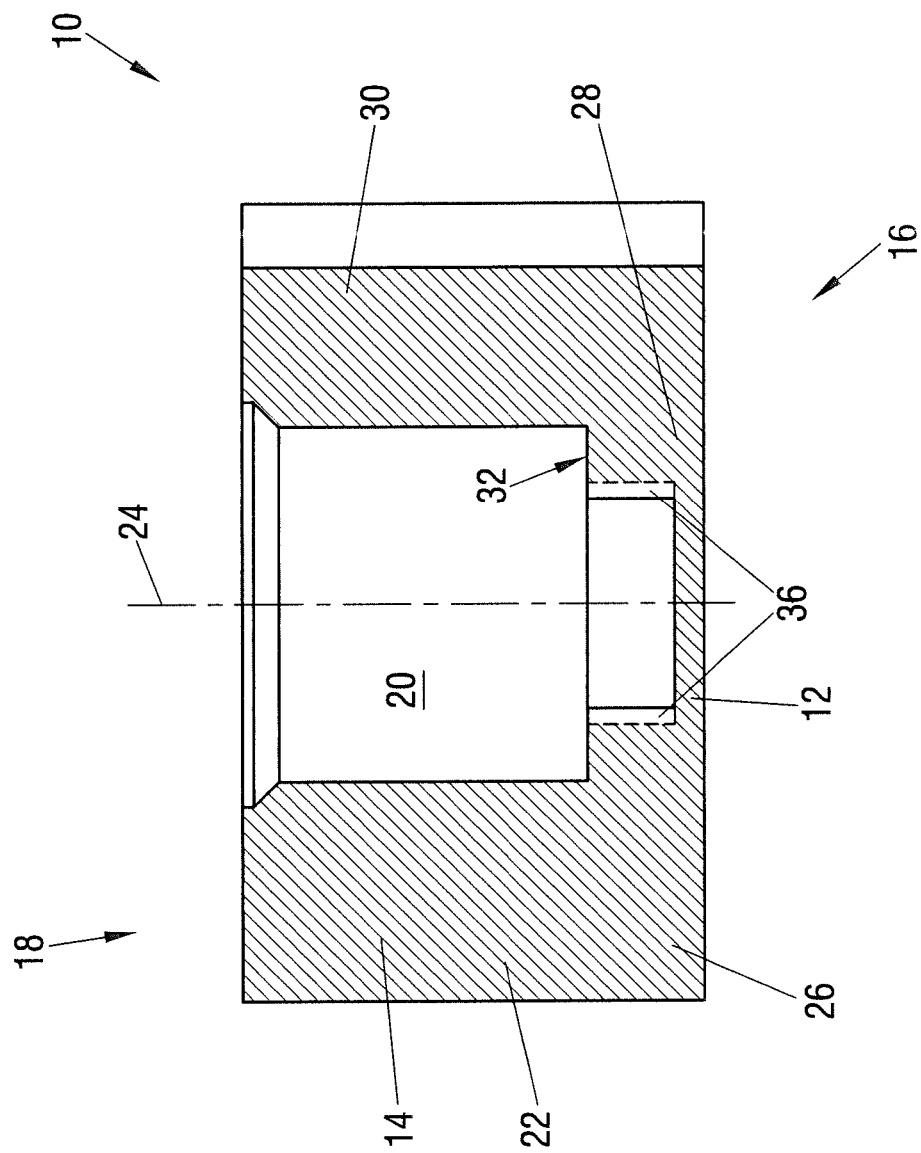

The embodiment in FIGS. 14 to 16 differs from the embodiment in FIGS. 11 to 13 with respect to the outer circumferential shape of the membrane 12 or with respect to the inner circumferential shape of the portion 28 of the supporting section 14. According to the embodiment in FIGS. 14 to 16, the membrane 12 also has an angular outer circumferential shape or an outer circumferential shape with corners 34. However, the boundary of the membrane 12 extending between the corners 34 is curved or has a curved shape, as can be seen in particular from FIG. 15. The boundary of the membrane 12 extending between the corners 34 is curved inwardly according to FIGS. 14 to 16. Consequently, the portion 28 of the supporting section 14 has inwardly curved wall sections 36. In a bottom view according to FIG. 15, this thus results in a membrane 12 with an angular shape as well as lateral constrictions. Advantageous properties specific to the application can be achieved by such a shape of the membrane 12.

Figure 17:
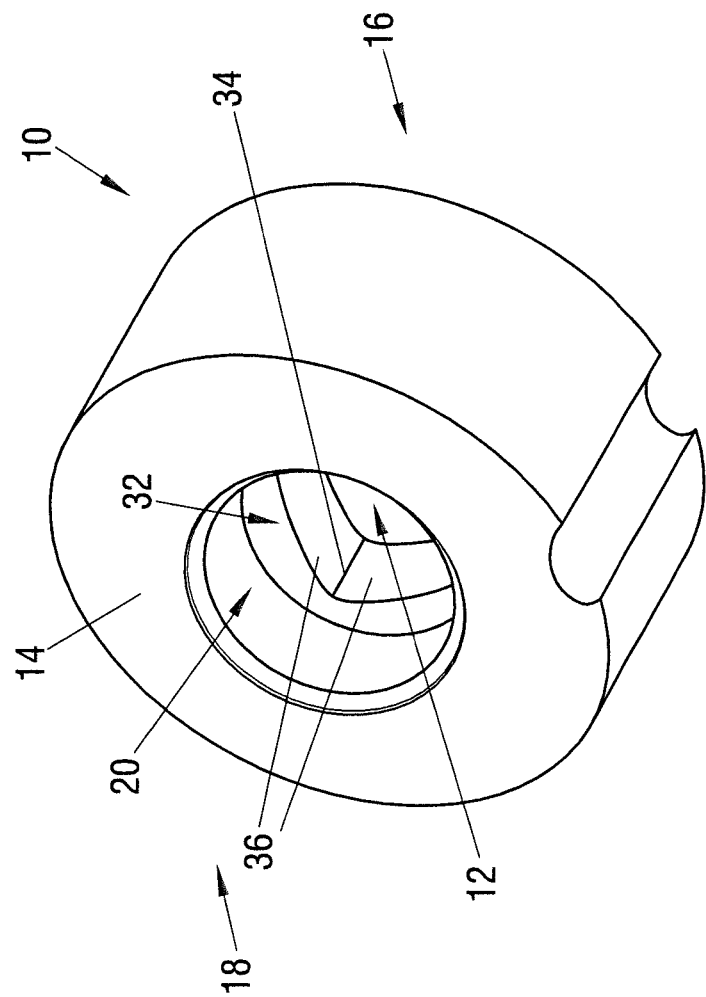
Figure 18:
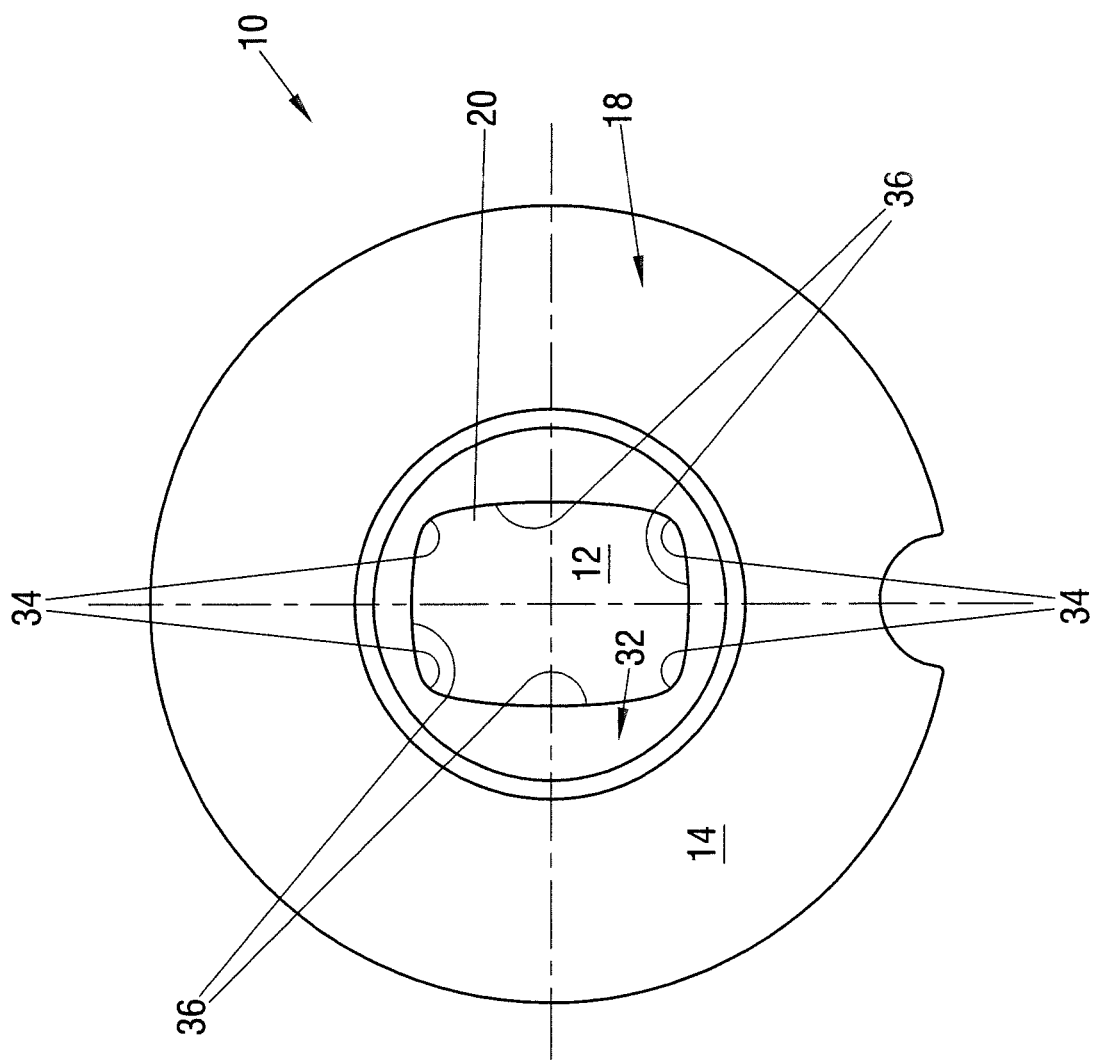
Figure 19:
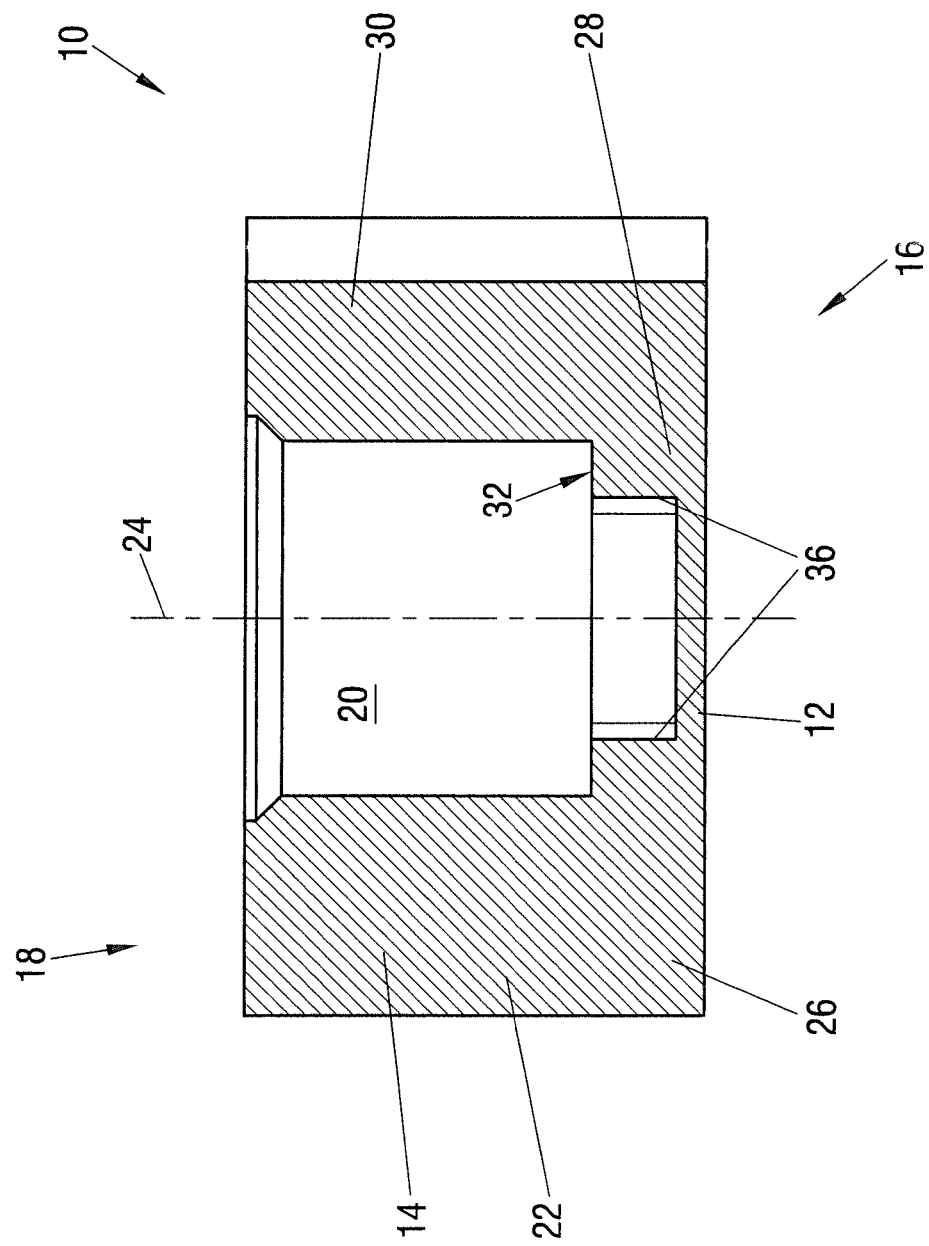

The embodiment in FIGS. 17 to 19 differs from the embodiment in FIGS. 14 to 16 with respect to the outer circumferential shape of the membrane 12 or with respect to the inner circumferential shape of the portion 28 of the supporting section 14. According to the embodiment in FIGS. 17 to 19, the membrane 12 also has an angular outer circumferential shape or an outer circumferential shape with corners 34 or rounded corners 34. The boundary of the membrane 12 extending between the corners 34 or rounded corners 34 is also curved or has a curved shape, as can be seen in particular in FIG. 18.

However, the boundary of the membrane 12 extending between the corners 34 is curved outwardly according to FIGS. 17 to 19, unlike in the embodiment according to FIGS. 14 to 16. Consequently, the portion 28 of the supporting section 14 has outwardly curved wall portions 36. In a bottom view according to FIG. 18, this thus results in a membrane 12 with a rounded angular shape as well as lateral bulges. Advantageous properties specific to the application can be achieved by such a shape of the membrane 12.

Figure 20:
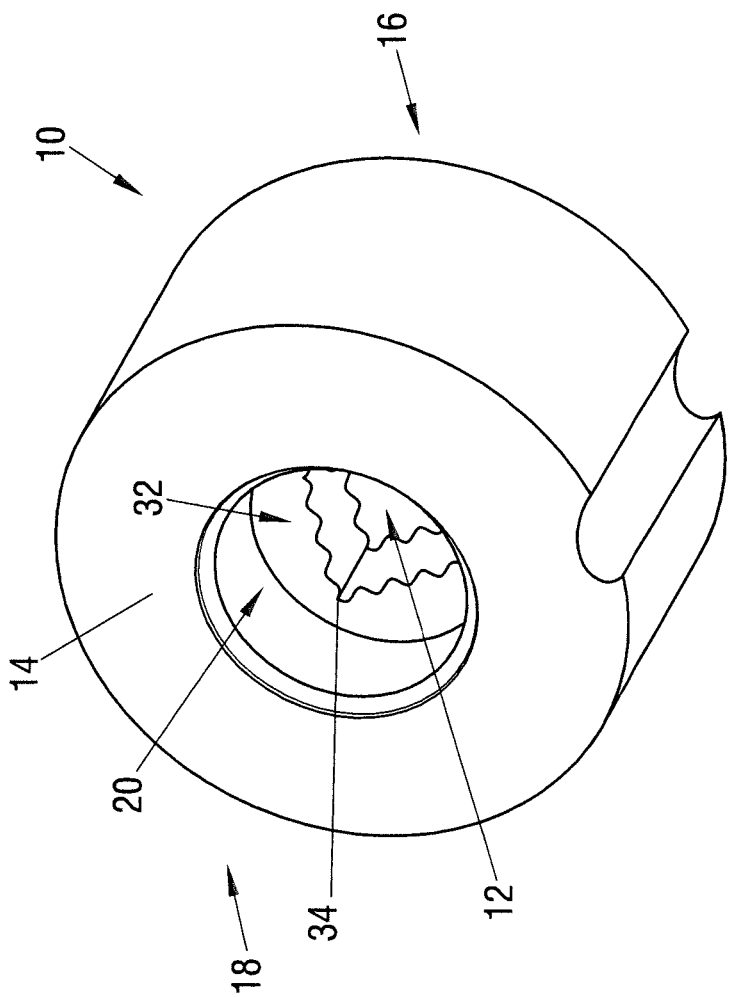
Figure 21:
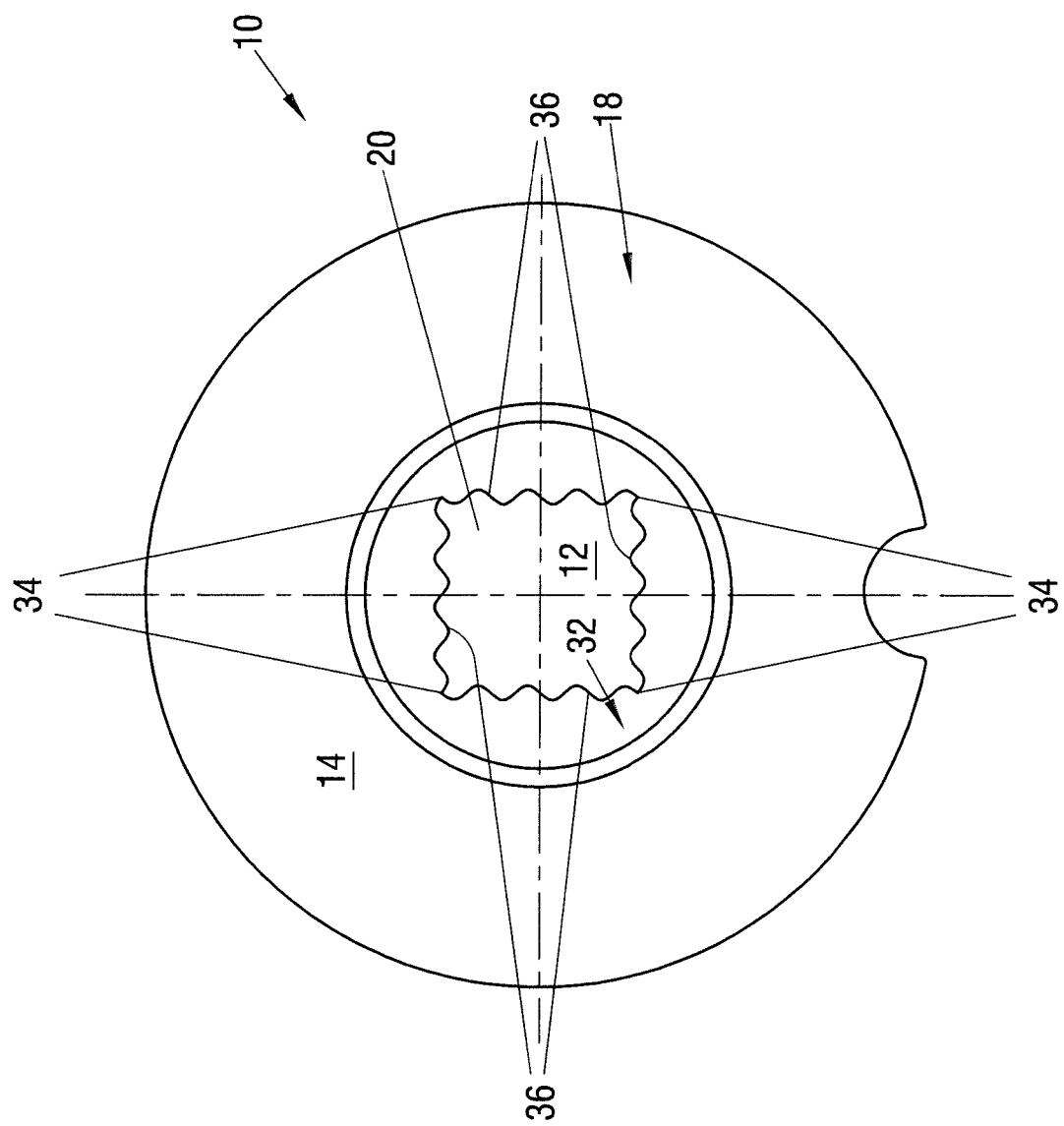
Figure 22:
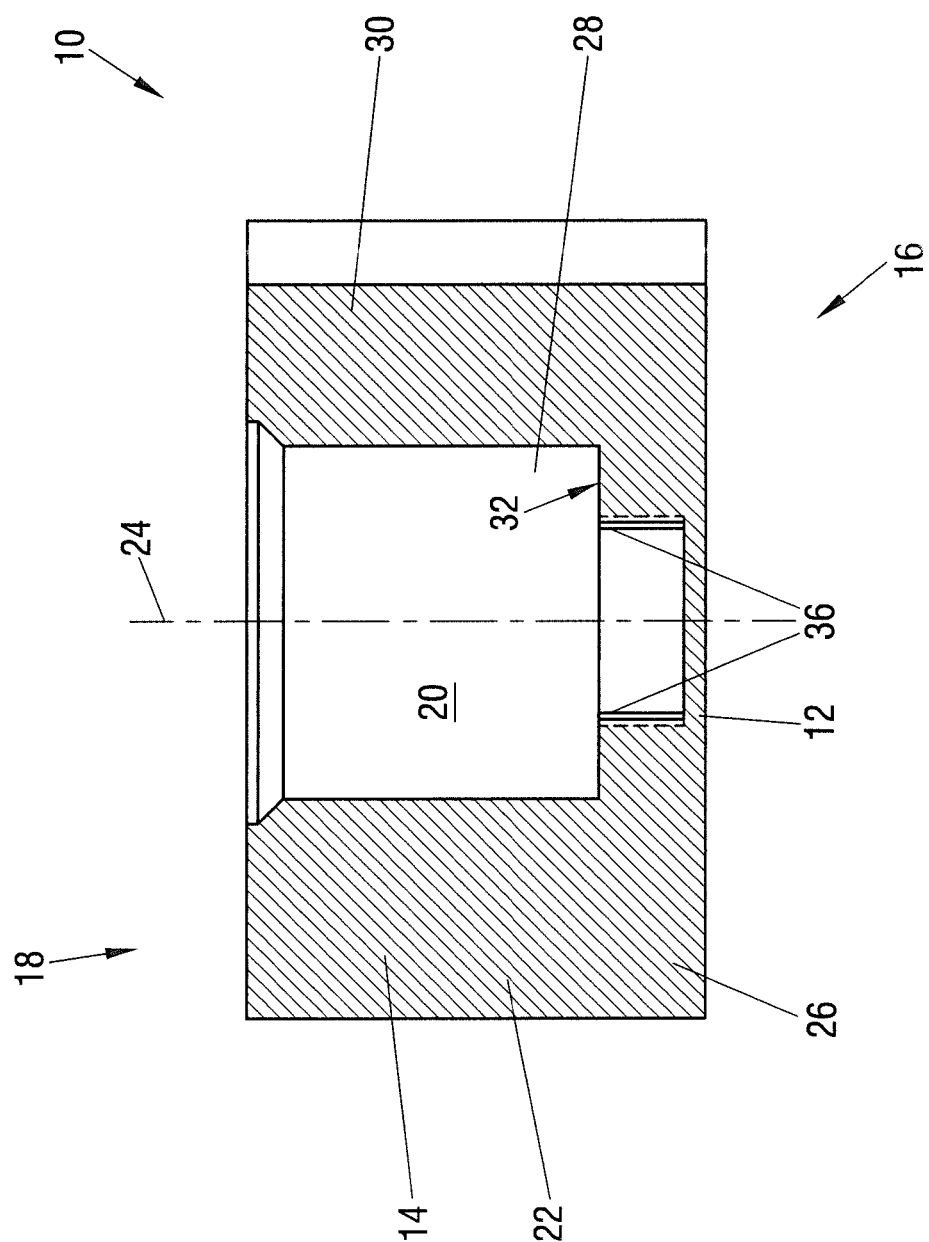

The embodiment in FIGS. 20 to 22 differs from the embodiment in FIGS. 14 to 19 with respect to the outer peripheral shape of the membrane 12 or with respect to the inner peripheral shape of the portion 28 of the supporting section 14. According to the embodiment in FIGS. 20 to 22, the membrane 12 also has an angular outer peripheral shape or an outer peripheral shape with corners 34.

However, according to FIGS. 20 to 22, the boundary of the membrane 12 extending between the corners 34 is corrugated or has a corrugated shape, as can be seen in particular from FIG. 21. Consequently, the portion 28 of the supporting section 14 has corrugated and/or wavy wall portions 36. In a bottom view according to FIG. 21, this thus results in a membrane 12 with an overall angular shape as well as a lateral corrugation boundary or lateral corrugation shaping.

Instead of the lateral wave boundary or lateral wave shaping, serrated or jagged boundaries of the membrane 12 can also be provided. In this case, the membrane 12 is defined between the corners 34 by a serrated limitation. Such shaping can ensure application-specific advantageous properties.

Figure 23:
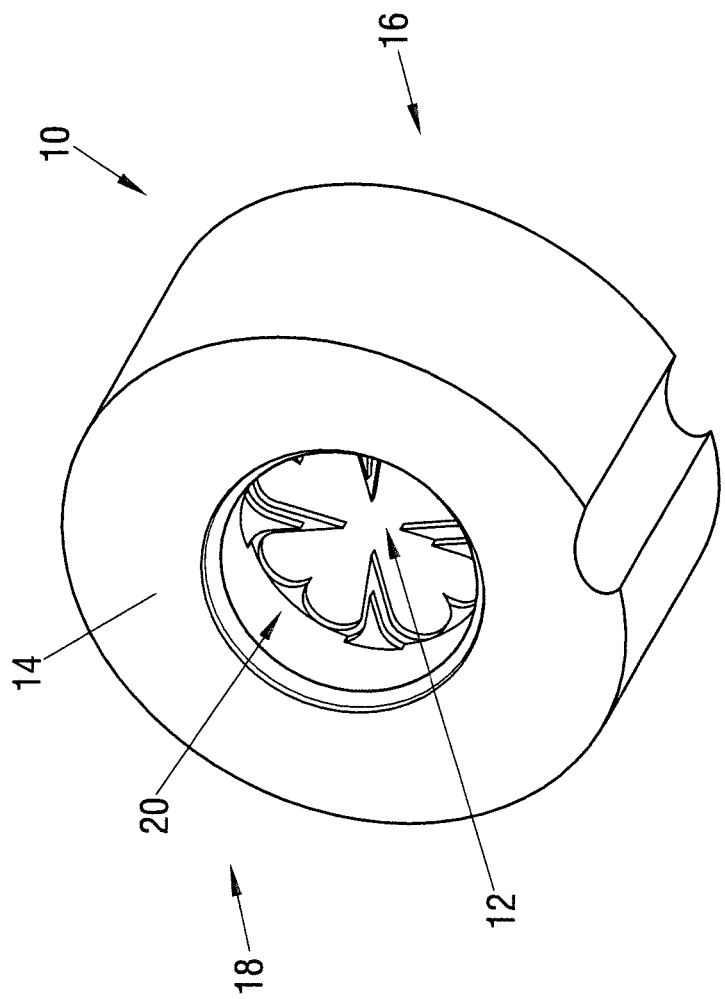
Figure 24:
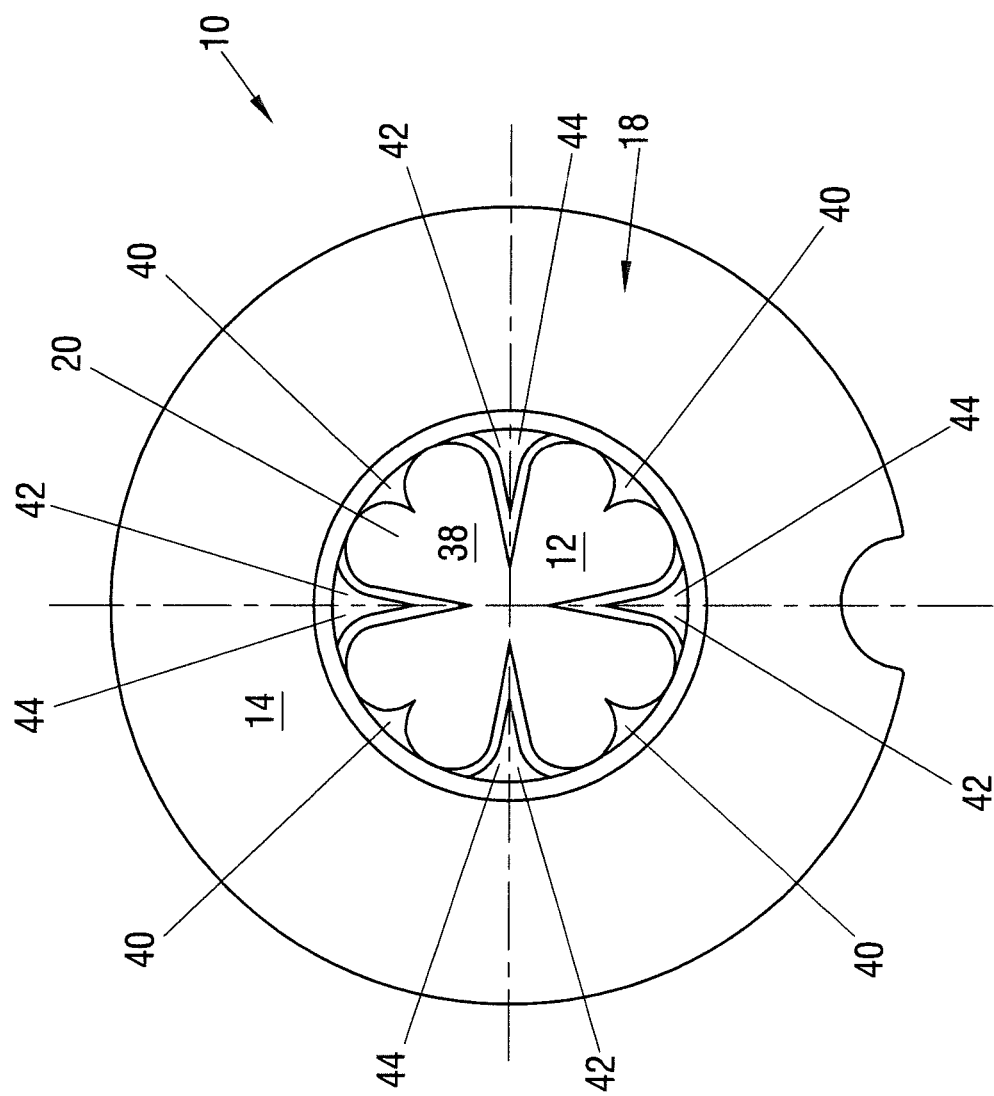
Figure 25:
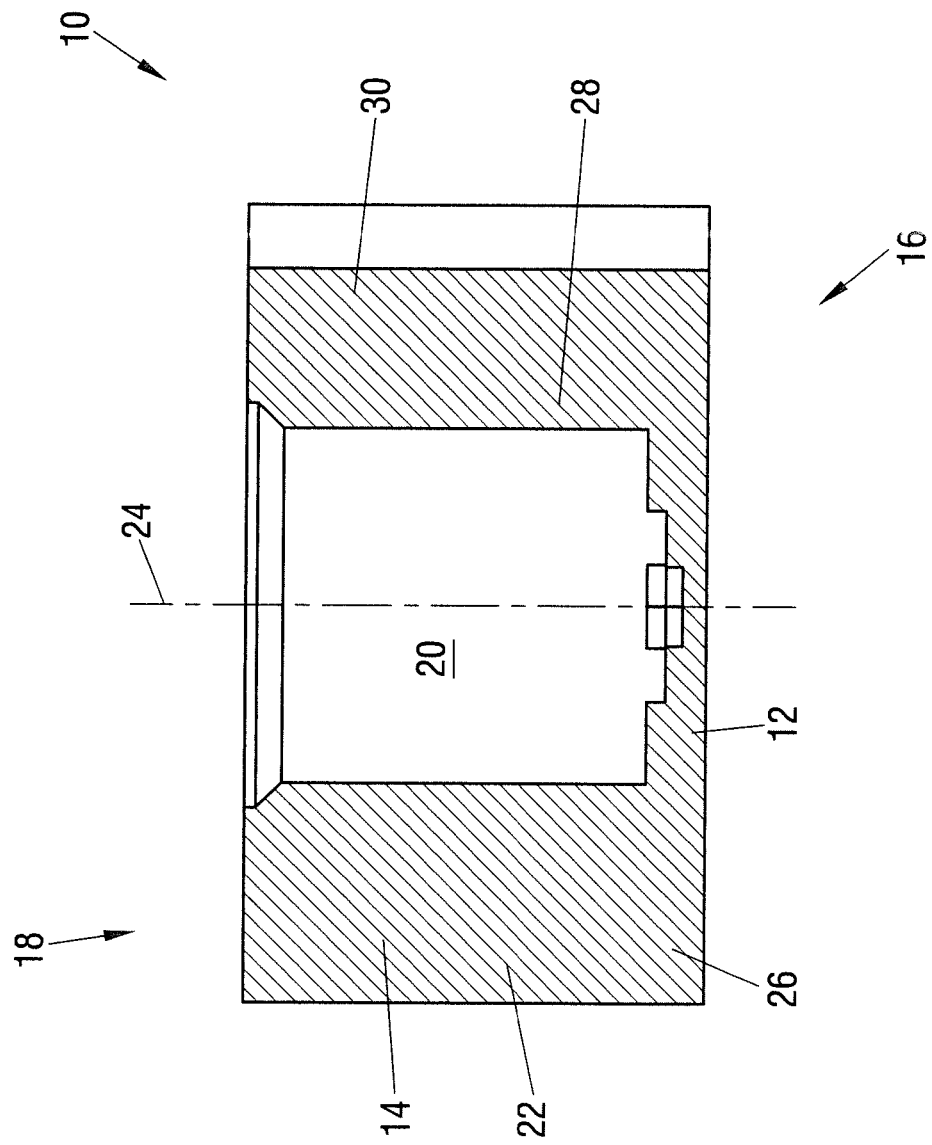

The embodiment in FIGS. 23 to 25 differs from the embodiment in FIGS. 1 to 6 with respect to the design of the membrane 12. According to the embodiment in FIGS. 23 to 25, the membrane 12 also has a circular outer circumferential shape, but is provided with a height or thickness structuring. This can be understood as variations of the thickness or the extension of the membrane 12 in height direction 24. Accordingly, the membrane 12 according to FIGS. 23 to 25 has portions with different thicknesses or with different thicknesses in the height direction 24 of the shaped body 10.

Membrane portions with greater thicknesses or greater thicknesses or extensions in height direction 24 can accordingly be produced by a greater number of layers and/or by greater layer thicknesses than membrane portions with smaller thicknesses or smaller thicknesses or extensions in height direction 24.

It can be seen from FIGS. 23 to 25 that the membrane 12 has an inner section 38 of relatively small thickness. The inner portion 38 is surrounded by a plurality of outer portion 40 and 42 of greater thickness. The inner portion 38 may have a cloverleaf-like shape or a cloverleaf-like outer contour in a bottom view as shown in FIG. 24. The outer portions 40 and 42 of greater thickness may extend into the inner portion 38 to form a support structure. The resilience behavior of the membrane 12 can be influenced in this way.

The outer portions 40 and 42 can be dimensioned in such a way that they themselves exhibit a resilience during operation or ensure a flexibility that can be measured during operation. The outer portions 40 can have a constant thickness. The outer portions 42 may in turn be of stepped design and thus have two different thickness ranges. The regions of the outer portions 42 with greater thickness may each be formed by an extension 44 in the height direction 24. According to FIGS. 23 to 25, the thickness of the membrane 12 may be gradually reduced from the outer periphery to the center of the membrane. The outer portions 40 and 42 may provide a support functionality for the inner portion 38 in the manner of a leaf spring.

Figure 26:
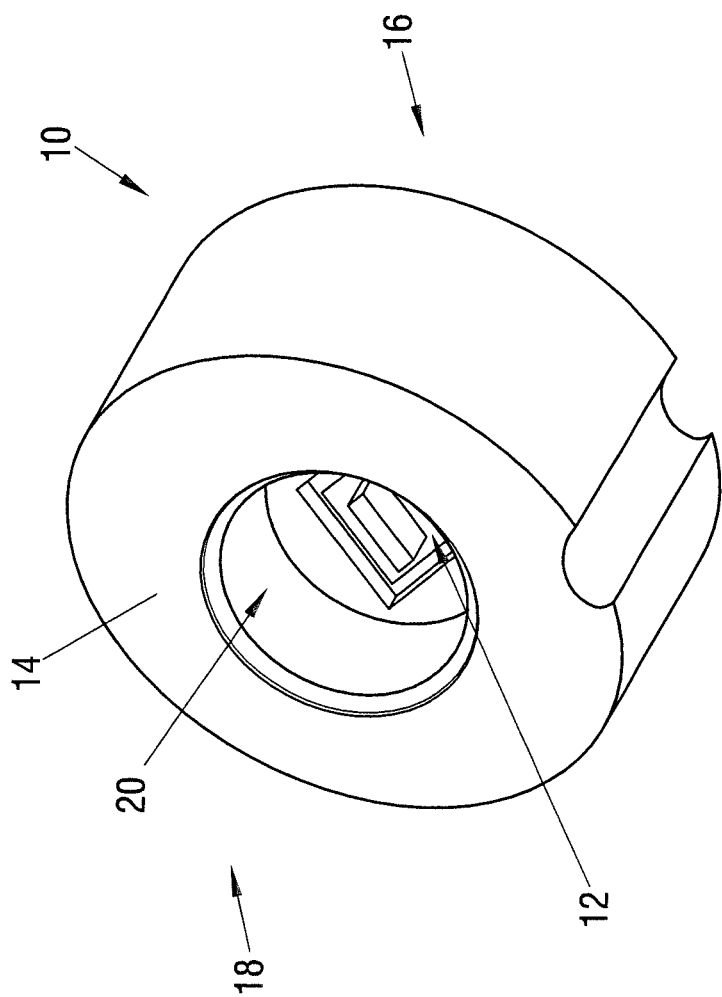
Figure 27:
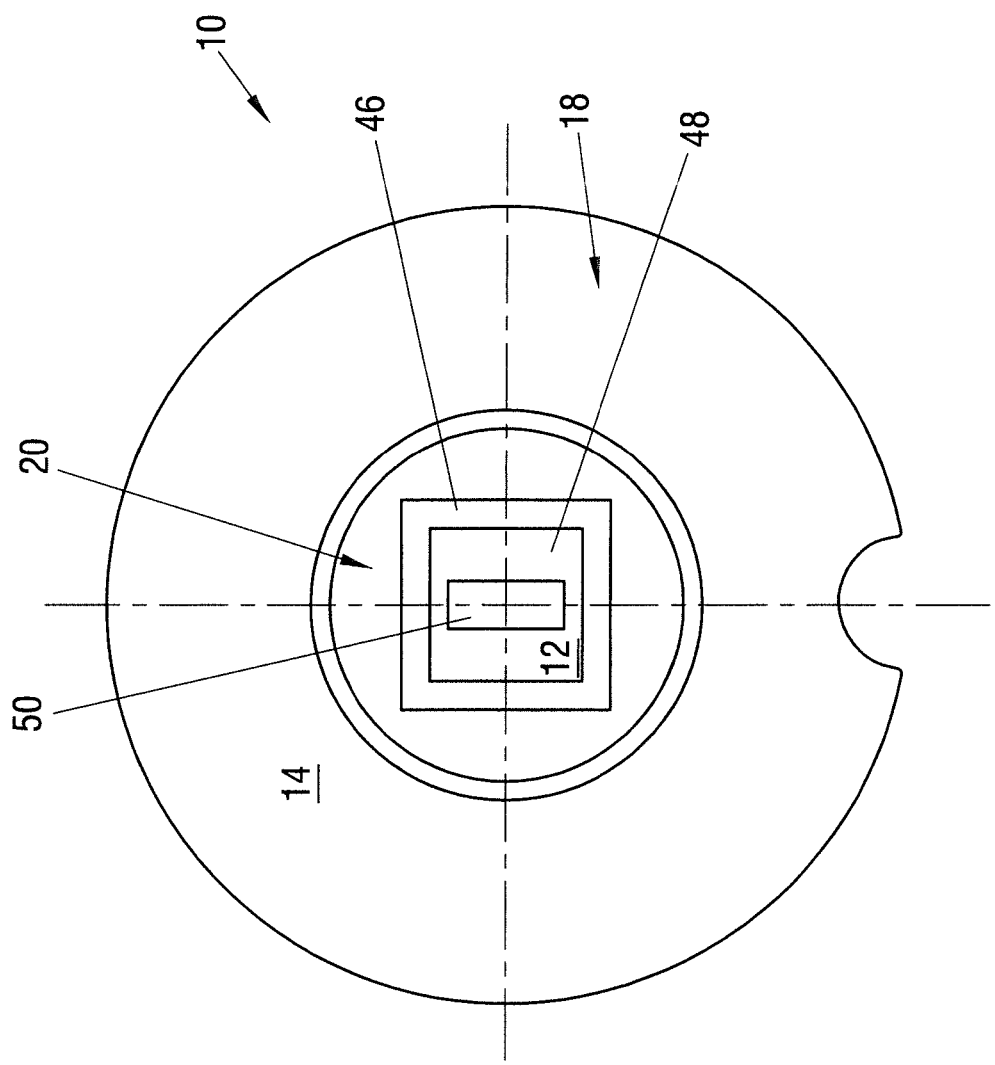
Figure 28:
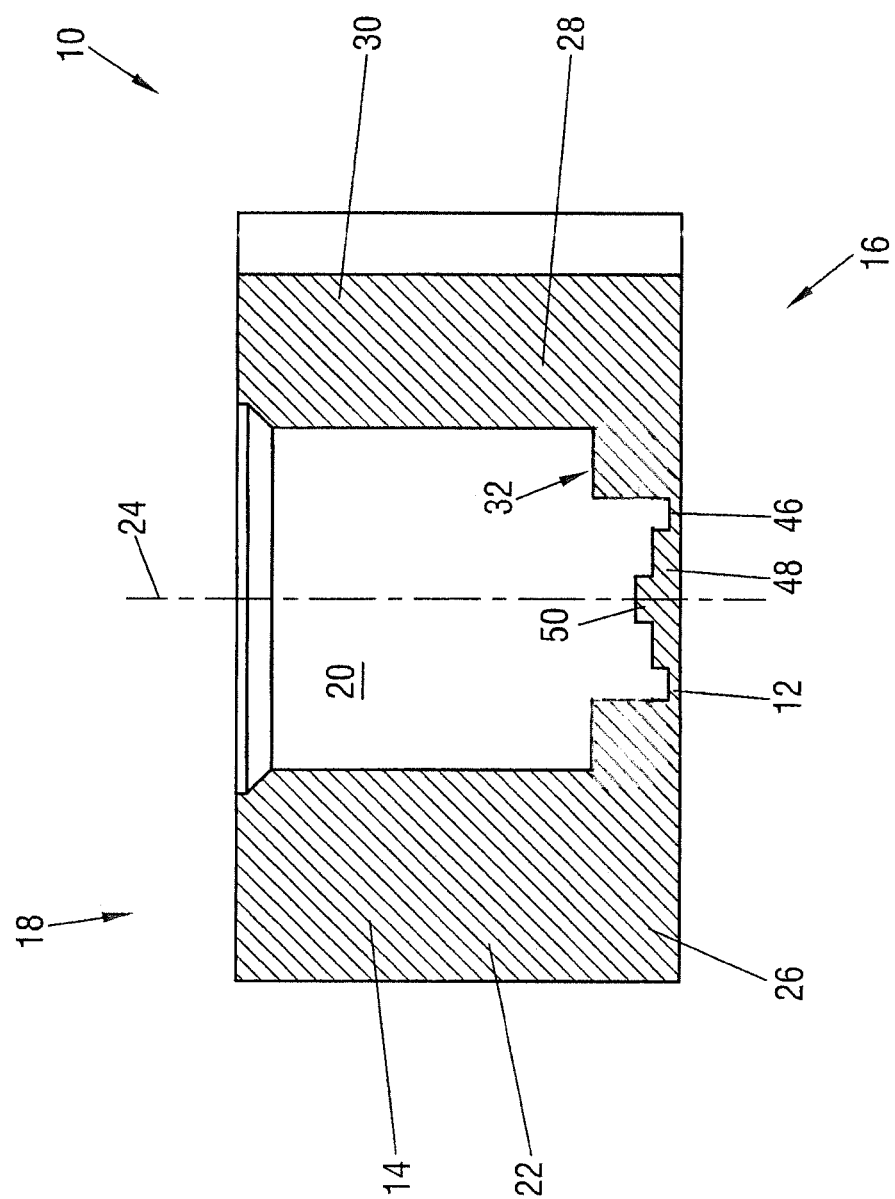

The embodiment in FIGS. 26 to 28 differs from the embodiment in FIGS. 11 to 13 with respect to the design of the membrane 12. According to the embodiment in FIGS. 26 to 28, the membrane 12 also has an angular outer circumferential shape, but is again provided with a height or thickness structuring. As mentioned above, this can be understood as variations of the thickness or the extension of the membrane 12 in height direction 24. Accordingly, the membrane 12 according to FIGS. 26 to 28 has sections with different thicknesses or with different thicknesses in the height direction 24 of the shaped body 10.

It can be seen from FIGS. 26 to 28 that the membrane 12 has an outer portion 46 of relatively small thickness. The outer portion 46 further surrounds an inner portion 48 of greater thickness. The inner portion 48 may have different thicknesses. In particular, the inner portion 48 may include a further thickened central portion 50. The central portion 50 may be formed by a block-like protrusion in the height direction 24. The inner portion 48 and/or the central portion 50 may form a support structure for the entire membrane 12 and for the outer portion 46 of the membrane 12, respectively. The resilience behavior of the membrane 12 can be influenced in this way.

The inner portion 48 and/or the central portion 50 can be dimensioned in such a way that they themselves exhibit resilience in operation or ensure a flexibility that can be measured in operation. It is also possible that the central portion 50 forms a local stiffening of the membrane 12 and only the remaining part of the inner portion 48 is dimensioned and/or designed for resilience in operation. The resilience behavior of the membrane 12, in particular the remaining part of the inner portion 48 as well as the outer portion 46, can be influenced in this way.

Accordingly, the thickness of the membrane 12 according to FIGS. 26 to 28 may be gradually increased from the outer periphery to the center of the membrane. In particular, the inner portion 46 and/or the central portion 50 can provide a support functionality for the outer portion 46 in the manner of a leaf spring.

Figure 29:
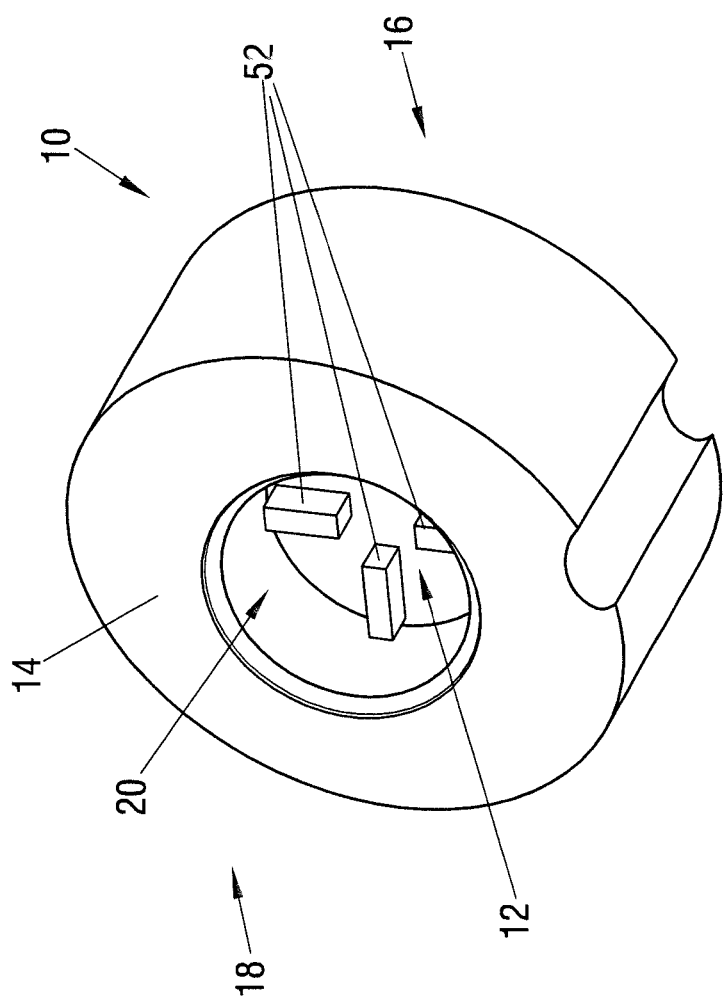
Figure 30:
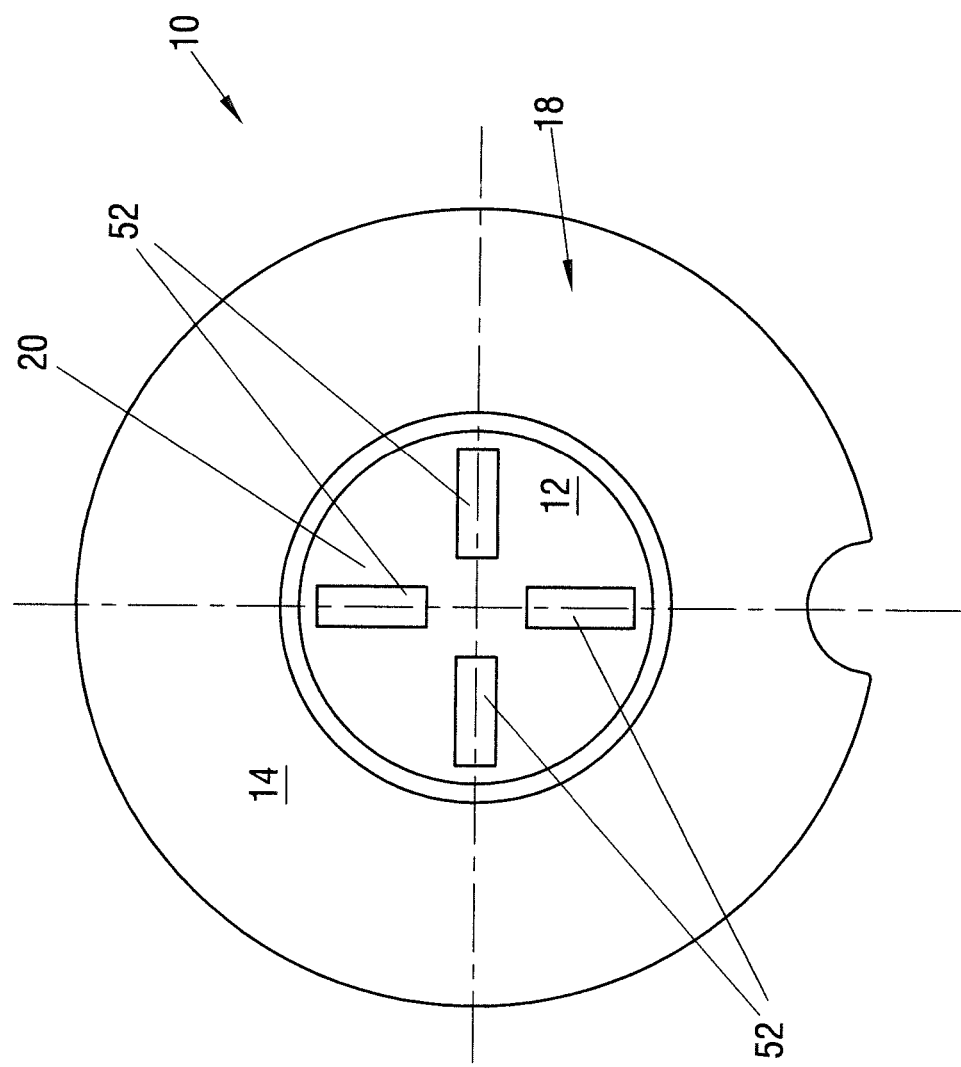
Figure 31:
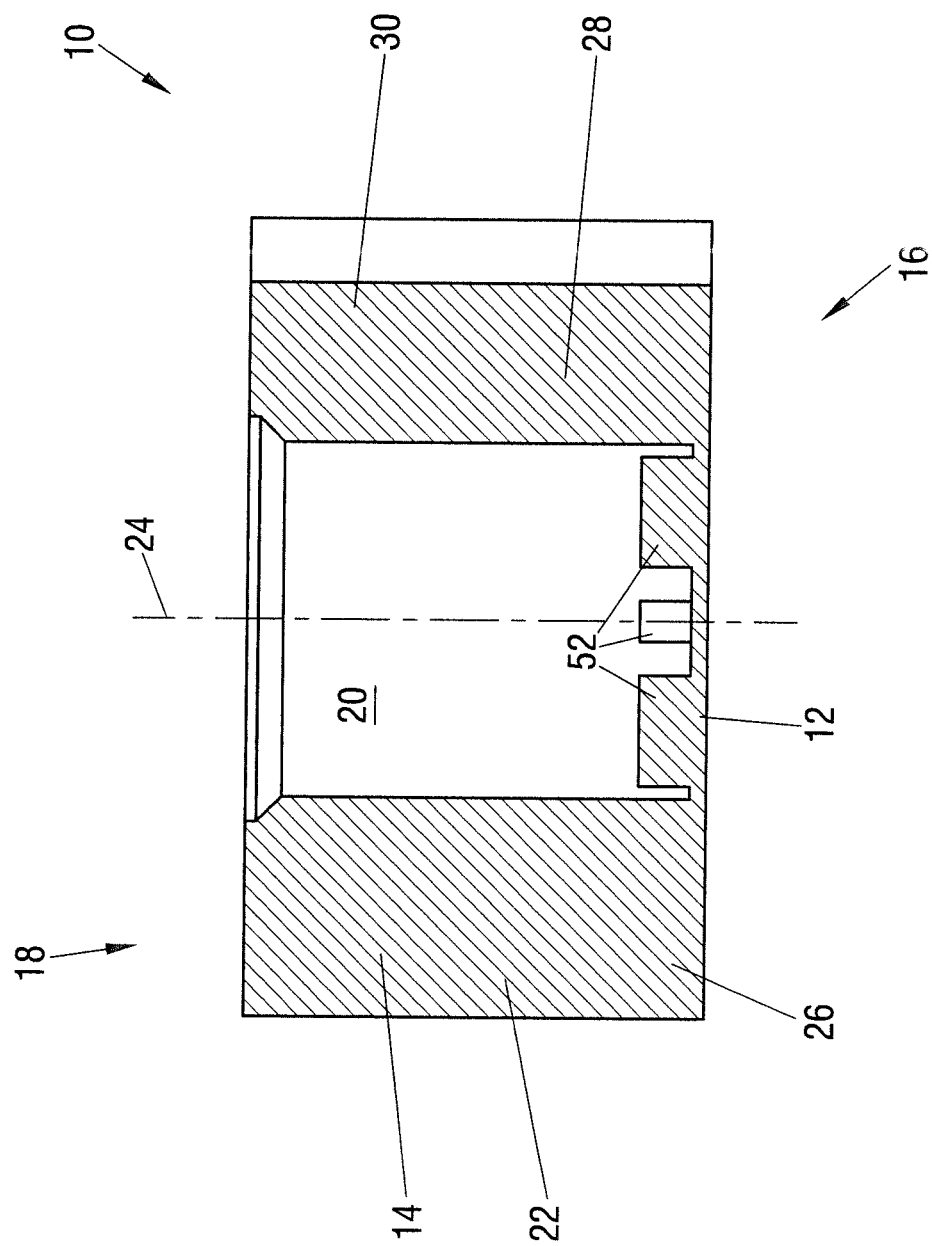

The embodiment in FIGS. 29 to 31 differs from the embodiment in FIGS. 1 to 6 with respect to the design of the membrane 12. According to the embodiment in FIGS. 29 to 31, the membrane 12 also has a circular outer circumferential shape, but is again provided with a height or thickness structuring. As mentioned above, this can be understood as variations of the thickness or the extension of the membrane 12 in height direction 24. Accordingly, the membrane 12 according to FIGS. 29 to 31 has sections with different thicknesses or different extensions in the height direction 24 of the shaped body 10.

It can be seen from FIGS. 29 to 31 that the membrane 12 has a relatively low thickness along a large part of its surface area. At a total of four defined points, however, the membrane 12 has locally limited support structures 52. The support structures 52 form extensions in the height direction 24 of the shaped body 10, so that the membrane 12 has a greater extension in the height direction 24 in the region of the support structures 52. In the event of a deflection of the membrane 12, for example in the course of a pressure measurement during operation, the support structures 52 can come into lateral contact with the inner circumferential surface of the supporting section 14 and thus ensure a deflection limitation. In this way, the deflection behavior of the membrane 12 can be suitably influenced and the operational safety increased.

Figure 32:
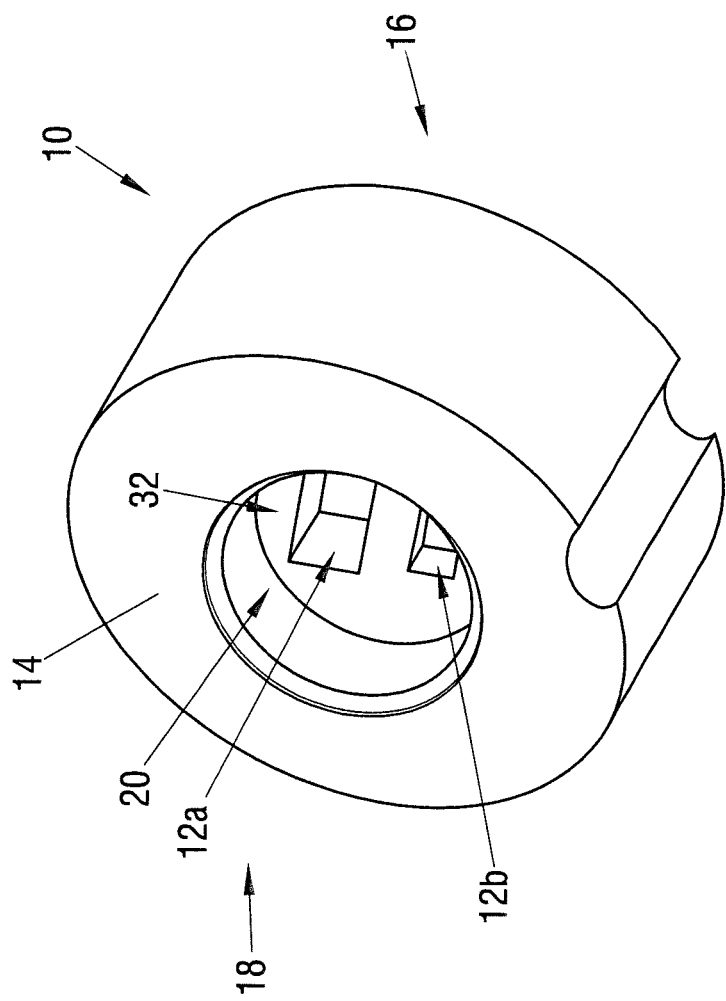
Figure 33:
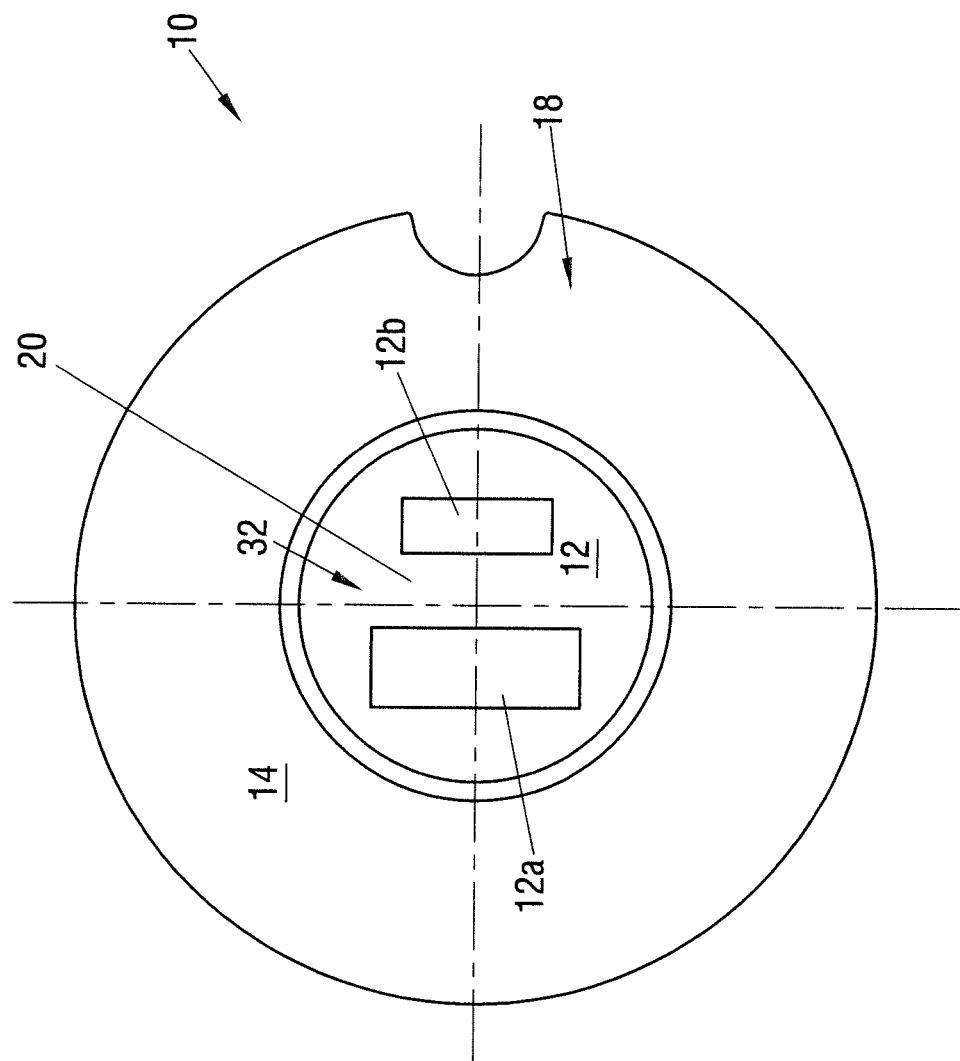
Figure 34:
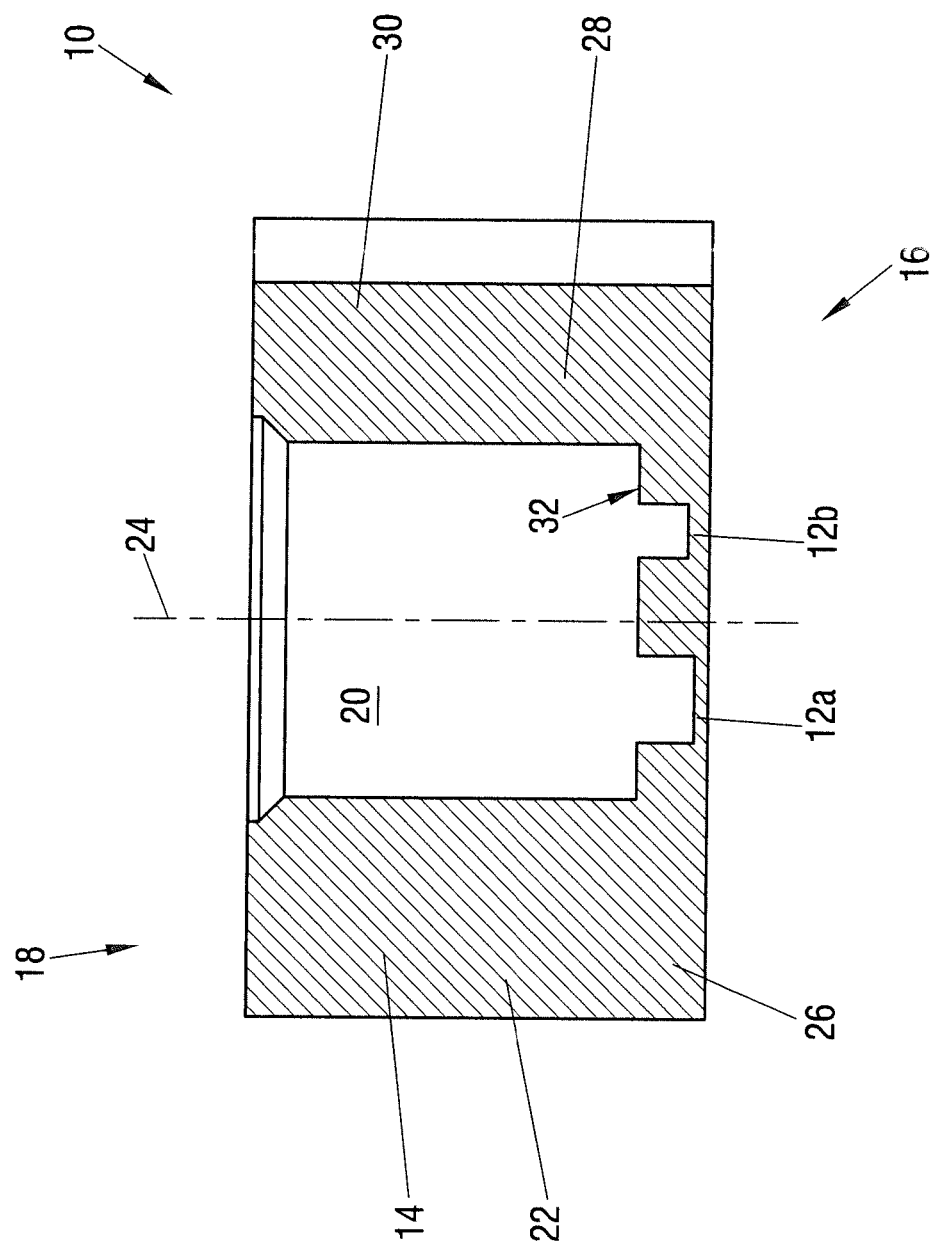

The embodiment in FIGS. 32 to 34 differs from the embodiment in FIGS. 11 to 13 again with regard to the membrane design. Thus, according to the embodiment in FIGS. 32 to 34, two membranes 12a and 12b designed separately from each other are provided. The supporting section 14 according to FIGS. 32 to 34 has sections with different inner circumferential shapes along its longitudinal extent, namely a portion 28 which surrounds the membranes 12a and 12b, and a portion 30 which adjoins the portion 28 in the height direction 24. This in turn results in a step 32 at the inner circumference of the supporting section 14.

The portion 30 of the supporting section 14 has a circular inner circumferential shape. In contrast, the portion 28 of the supporting section has recesses that define the outer circumferential shapes of the membranes 12a and 12b. The membranes 12a and 12b can thereby have different sizes, in particular in plane extension, and/or different thicknesses, which can be derived from FIGS. 33 and 34 in particular. In the embodiment according to FIGS. 32 to 34, the membranes 12a and 12b can each have a square or rectangular outer circumferential shape. However, other outer peripheral shapes are also feasible for the membranes 12a and 12b, for example, the membrane outer peripheral shapes described with reference to FIGS. 14 to 22. Furthermore, a larger number of membranes can also be provided. Overall, an embodiment with multiple membranes can expand the measurement functionality in operation, for example to cover different measurement ranges.

The shaped body 10 or the supporting section 14 may—according to all embodiments—have an overall height, in particular in height direction 24 or along a longitudinal extension of the shaped body 10, of less than 15 mm, preferably less than 12 mm, more preferably less than 10 mm, more preferably less than 8 mm, more preferably less than 6 mm, even more preferably less than 4 mm or about 4 mm. Furthermore, the shaped body 10 or the supporting section 14 may have an overall height, in particular in the height direction 24 or along a longitudinal extension of the shaped body 10, of more than 2 mm, more preferably of more than 3 mm.

The shaped body 10 can—according to all embodiments—preferably be produced from a ceramic material, in particular from an aluminum oxide or from a material containing aluminum oxide. In particular, the membrane 12 and/or the supporting section 14 may be made of such a ceramic material. Thereby, the materials of the membrane 12 as well as of the supporting section 14 may be identical or different from each other. It is possible that the membrane 12 as well as the supporting section 14 have identical basic materials but different additives and thus have a material composition that differs from each other.

Furthermore, the supporting section 14—according to all embodiments—can consist of different materials or material compositions in different areas. The region 22 of the supporting section 14, which surrounds the membrane 12 in the circumferential direction, can be made of the same material or the same material composition as the membrane 12. In contrast, the supporting section 14 can be made of a different material or a different material composition in a region 26, which projects in the height direction 24 or along the longitudinal extent of the shaped body 10 relative to the membrane 12.

The shaped body 10 can be manufactured with only minimal effort by means of additive manufacturing, in particular by means of 3D screen printing. Any post-processing, in particular mechanical post-processing, of the membrane 12 can be avoided or reduced to a minimum. In this way, additive manufacturing can be used to achieve the desired thickness or properties of the membrane 12 directly, without the need for mechanical post-processing by means of grinding or lapping.

The one-piece design of the membrane 12 and the supporting section 14 also makes it possible to avoid subsequent connection steps between the membrane 12 and the supporting section 14. Overall, a molded part 10 can be produced in this way with only minimal manufacturing effort while at the same time meeting high quality requirements.

In a method for producing the molded article 10, the membrane 12 having a thickness of less than 0.5 mm and the supporting section 14 supporting the membrane 12 can be produced at least in sections by means of 3D screen printing.

Advantageously, the membrane 12 and the region 22 of the supporting section 14, which surrounds the membrane 12 in the circumferential direction, can first be printed in several layers. Subsequently, further layers of the supporting section 14, which protrude in the height direction 24 or along a longitudinal extension of the shaped body 10 relative to the membrane 12, can be produced by applying further layers. This creates the region 26 of the supporting section 14.

The layer thicknesses in region 26 can be greater than in region 22 of the supporting section 14. In this way, a membrane 12 or a region 22 of the supporting section 14 surrounding the membrane 12 can be manufactured with high accuracy. On the other hand, the required overall height of the supporting section 14 can be achieved at a high production speed due to the higher layer thicknesses in region 26.

The invention claimed is:

1. A shaped body (10) for a pressure sensor, having a membrane (12) and having a supporting section (14) supporting the membrane (12), the membrane (12) and the supporting section (14) being produced at least in sections from a ceramic material by additive manufacturing, wherein the membrane (12) and the supporting section (14) are produced in one piece to form a monolithic body free of a subsequent connection of the membrane (12) to the supporting section, and wherein the greatest possible distance between two points lying on the outer circumference of the membrane (12) is less than 20 mm.

2. The shaped body (10) according to claim 1, characterized in that the membrane (12) has, at least in sections, a thickness of less than 0.5 mm, and/or in that the membrane (12) has, at least in sections, a thickness of more than 0.1 mm.

3. The shaped body (10) according to claim 1, characterized in that the membrane (12) and the supporting section (14) are each produced completely from a ceramic material and/or in that the materials of the membrane (12) and of the supporting section (14) differ from one another and/or in that the materials of the membrane (12) and of the supporting section (14) have an identical base material and/or other auxiliary materials.

4. The shaped body (10) according to claim 1, characterized in that the membrane (12) and/or the supporting section (14) are produced entirely by means of 3D screen printing and/or in that the membrane (12) is produced free of mechanical finishing operations, and/or in that the membrane (12) and/or the supporting section (14) is produced exclusively by means of 3D screen printing.

5. The shaped body (10) according to claim 1, characterized in that in that the membrane (12) is produced from a number of at least 3 layers and/or from 15 layers at most.

6. The shaped body (10) according to claim 1, characterized in that the membrane (12) and the supporting section (14) are each generated from a plurality of printed layers and/or that at least one printed layer of the membrane (12) has a smaller thickness than a printed layer of the supporting section (14).

7. The shaped body (10) according to claim 1, characterized in that the supporting section (14) has, in a region (22) adjacent to the membrane (12) in the circumferential direction, layer thicknesses which correspond to the layer thicknesses of the membrane (12), and/or in that the supporting section (14) is produced, in a region adjacent to the membrane (12) in the circumferential direction, from layers which merge into layers of the membrane (12) without interruption.

8. The shaped body (10) according claim 1, characterized in that the membrane (12) is designed to be fluid-tight, and/or in that the thickness and/or the material of the membrane (12) and/or the number and/or thickness of the layers of the membrane (12) is selected to achieve fluid-tight properties.

9. The shaped body (10) according to claim 1, characterized in that the membrane (12) has, at least in sections, a rounded, in particular circular, outer circumferential shape and/or in that the membrane (12) has an outer circumferential shape with at least one corner, in particular with a plurality of corners, and/or in that the membrane (12) has a quadrangular, rectangular, in particular square, triangular, pentagonal or hexagonal outer circumferential shape.

10. The shaped body (10) according to claim 1, characterized in that the supporting section (14) has an inner peripheral shape corresponding to the outer peripheral shape of the membrane (12), and/or in that the supporting section (14) has an inner peripheral shape corresponding to the outer peripheral shape of the supporting section (14), and/or in that the inner circumferential shape of the supporting section

(14) differs from the outer circumferential shape of the supporting section (14) and/or in that the supporting section (14) has portions with different inner circumferential shapes along a longitudinal extension.

11. The shaped body (10) according to claim 1, characterized in that the greatest possible distance between two points lying on the outer circumference of the membrane (12) is less than 18 mm, and/or in that the greatest possible distance between two points lying on the outer circumference of the membrane (12) is defined by a diameter or by a diagonal of the membrane (12).

12. The shaped body (10) according to claim 1, characterized in that in a cross-section of the supporting section (14), the greatest possible distance between two points lying on the outer circumference of the supporting section (14) is less than 25 mm, and/or in that the greatest possible distance between two points lying on the outer circumference of the supporting section (14) is defined by a diameter or by a diagonal.

13. The shaped body (10) according to claim 1, characterized in that the membrane (12) has a height and/or thickness structuring and/or that the membrane (12) has variations in thickness and/or in extension in the height direction (24) and/or in that the membrane (12) has portions with different thicknesses and/or with different thicknesses and/or extensions in the height direction and/or in that several membranes (12a, 12b) being separated from one another are provided.

14. A pressure sensor for measuring the pressure of fluids, having the shaped body (10) according to claim 1 and having an electrical arrangement by means of which a deformation of the membrane (12) of the shaped body (10) can be detected.

15. A method for producing a shaped body (10) according to claim 1, in which the membrane (12) and the supporting section (14) supporting the membrane (12) are produced at least in sections by means of 3D screen printing, wherein the membrane (12) and the supporting section (14) are produced in one piece to form a monolithic body free of a subsequent connection of the membrane (12) to the supporting section, and wherein the greatest possible distance between two points lying on the outer circumference of the membrane (12) is less than 18 mm.

* * * * *